United States Patent
Kajihara et al.

(10) Patent No.: US 11,636,399 B2
(45) Date of Patent: Apr. 25, 2023

(54) PARAMETER ESTIMATION SYSTEM, PARAMETER ESTIMATION METHOD, AND PARAMETER ESTIMATION PROGRAM RECORDING MEDIUM FOR ESTIMATING PARAMETER AND KERNEL FUNCTIONS BY INCORPORATING MACHINE LEARNING

(71) Applicants: NEC CORPORATION, Tokyo (JP); National Institute of Advanced Industrial Science and Technology, Tokyo (JP)

(72) Inventors: Takafumi Kajihara, Tokyo (JP); Keisuke Yamazaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 375 days.

(21) Appl. No.: 16/753,266

(22) PCT Filed: Oct. 1, 2018

(86) PCT No.: PCT/JP2018/036731
§ 371 (c)(1),
(2) Date: Apr. 2, 2020

(87) PCT Pub. No.: WO2019/069865
PCT Pub. Date: Apr. 11, 2019

(65) Prior Publication Data
US 2020/0250586 A1  Aug. 6, 2020

(30) Foreign Application Priority Data
Oct. 3, 2017 (JP) ............................. JP2017-193245

(51) Int. Cl.
*G06N 20/10* (2019.01)
*G06N 7/00* (2006.01)

(52) U.S. Cl.
CPC ............... *G06N 20/10* (2019.01); *G06N 7/00* (2013.01)

(58) Field of Classification Search
CPC ................................. G06N 20/10; G06N 7/00
(Continued)

(56) References Cited

U.S. PATENT DOCUMENTS 5,950,146 A * 9/1999 Vapnik .................... G06F 17/17
706/20
6,112,195 A * 8/2000 Burges ................... G06V 10/42
706/20
(Continued)

FOREIGN PATENT DOCUMENTS

JP     2014-112292 A     6/2014
JP     2015-22354 A      2/2015
(Continued)

OTHER PUBLICATIONS

Ayassi et al, "An Overview on Machine Learning-Based Solutions to Improve Lightpath QoT Estimation", IEEE, pp. 1-4 (Year: 2020).*
(Continued)

*Primary Examiner* — Anil Khatri
(74) *Attorney, Agent, or Firm* — Sughrue Mion, PLLC

(57) ABSTRACT

A first sample acquisition unit acquires a parameter sample from a prior distribution. A function execution unit acquires data from a distribution by supplying the sample to a function. A degree-of-similarity calculation unit calculates the degree of similarity between the data and correct data using a kernel function. A kernel mean construction unit constructs a kernel mean of a posterior distribution from the degree of similarity, the sample, and the kernel function. A second sample acquisition unit acquires a new parameter sample from the kernel mean and the kernel function. A
(Continued)

sample evaluation unit determines whether the difference between new data obtained by supplying one sample selected from the new samples to the function and the correct data is less than a prescribed threshold value. When it is determined that the difference is less than the prescribed threshold value, the sample evaluation unit estimates the selected sample as a parameter. The present invention enables estimation of a high-dimensional parameter of the function, thus making it possible to reduce calculation time.

10 Claims, 14 Drawing Sheets

(58) Field of Classification Search
USPC .................................................. 706/12–45
See application file for complete search history.

(56) References Cited

U.S. PATENT DOCUMENTS

| | | | | |
|---|---|---|---|---|
| 6,789,069 | B1* | 9/2004 | Barnhill | G06N 20/10 706/45 |
| 7,272,587 | B1* | 9/2007 | Przytula | G06N 7/005 706/52 |
| 7,421,417 | B2* | 9/2008 | Mangasarian | G06K 9/6269 706/46 |
| 7,805,388 | B2* | 9/2010 | Weston | G06K 9/6231 706/45 |
| 8,005,770 | B2* | 8/2011 | Minh | G06N 7/005 706/26 |
| 8,533,129 | B2* | 9/2013 | Kejariwal | G06N 5/003 706/12 |
| 8,645,294 | B1* | 2/2014 | Owechko | G06T 7/35 706/14 |
| 9,558,452 | B2* | 1/2017 | Guiver | G06N 7/00 |
| 9,652,722 | B1* | 5/2017 | Narsky | G06N 20/10 |
| 9,715,723 | B2* | 7/2017 | Shlain | G06T 7/0004 |
| 9,818,136 | B1* | 11/2017 | Hoffberg | G07F 17/32 |
| 10,360,601 | B1* | 7/2019 | Adegan | G06Q 30/0283 |
| 10,646,156 | B1* | 5/2020 | Schnorr | G06N 3/0454 |
| 10,783,589 | B2* | 9/2020 | Miyamoto | H04L 9/3239 |
| 10,958,869 | B1* | 3/2021 | Chi | G06N 3/0454 |
| 11,069,082 | B1* | 7/2021 | Ebrahimi Afrouzi | G06T 7/70 |
| 11,306,162 | B2* | 4/2022 | Kuppuswamy | C08F 10/02 |
| 11,409,629 | B1* | 8/2022 | Ganti | G06N 20/00 |

FOREIGN PATENT DOCUMENTS

| | | |
|---|---|---|
| JP | 2017-33198 A1 | 2/2017 |
| WO | 2016/067369 A1 | 5/2016 |

OTHER PUBLICATIONS

Nataraj et al, "Dictionary-Free MRI Parameter Estimation Via Kernel Ridge Regression", IEEE, pp. 5-9 (Year: 2017).*
Cheng et al, "A Kernel Density-Based Particle Filter for State and Time-Varying Parameter Estimation in Nonlinear State-Space Models", IEEE, pp. 1664-1668 (Year: 2017).*
Song et al, "Optimizing Kernel Machines Using Deep Learning", IEEE, pp. 5528-5540 (Year: 2018).*
Wei et al, "Adaptive Transfer Kernel Learning for Transfer Gaussian Process Regression", IEEE, pp. 1-14 (Year: 2015).*
Zhang et al, "Clustering Neural Patterns in Kernel Reinforcement Learning Assists Fast Brain Control in Brain-Machine Interfaces", IEEE, pp. 1684-1694 (Year: 2019).*
Toghiani-Rizi et al, "Evaluating Deep Reinforcement Learning for Computer Generated Forces in Ground Combat Simulation", IEEE, pp. 3433-3438 (Year: 2017).*
Shigeki Nakagome et al., "Kernel Approximate Bayesian Computation in Population Genetic Inferences", Statistical Applications in Genetics and Molecular Biology, 2013, 27 pgs., vol. 12, No. 16.
Round-trip Analysis of Pedestrians in Urban Center (No. 2) "Attributes of Visitors in Urban Center", Nagoya Urban Institute, Research Report, No. 117, 2015, 17 pgs.
"Detailed Analysis of Round-Trip Behavior in Town and Prediction Model for Policy Simulation", Journal of Japan Society of Civil Engineers, 2015, pp. 323-335, vol. 71, No. 5.
Takuo Matsubara et al., "New Lerning Algorythm of Neural Network using Integral Representation and Kernel Herding", IEICE Technical Report, Feb. 27, 2017, pp. 25-31, vol. 116, No. 500.
Koichi Kobayashi et al., "Parameter Estimation and Active Learning in the ZRP Based on Traffic Spatiotemporal Data", IEICE Technical Report, Oct. 31, 2012, pp. 97-101, vol. 112, No. 279.
International Search Report for PCT/JP2018/036731 dated Dec. 18, 2018 (PCT/ISA/210).
Written Opinion of the International Searching Authority for PCT/JP2018/036731 dated Dec. 18, 2018 (PCT/ISA/237).
Japanese Notice of Allowance dated Feb. 3, 2021, issued by the Japanese Patent Office in application No. 2019-546701.
Mitrovic et al., "DR-ABC: Approximate Bayesian Computation with Kernel-Based Distribution Regression", arXiv.org [online], Cornell University, Feb. 2016, arXiv:1602.04805v1, 10 pages.

* cited by examiner

Toymodel-g TARGET MAP

```
Rule1:= {
  Start= SG1,Goal=SG1,
  Transit= P1(1h),P5(0.5h)
  N= 3000,T=9:30,Δ=1h
}
Rule2:= {
  Start= SG1,Goal=SG1,
  Transit= P2(1h),P5(0.5h)
  N= 1000,T=13:00,Δ=1h
}
Rule3:= {
  Start= SG2,Goal=SG2,
  Transit= P4(1.5h),P3(0.5h)
  N= 2000,T=10:00,Δ=1h
}
Rule4:= {
  Start= SG2,Goal=SG2,
  Transit= P3(0.5h),P1(1h)
  N= 1000,T=14:00,Δ=1h
}
Rule5:= {
  Start= SG2,Goal=SG2,
  Transit= P4(1h),P2(1h)
  N= 1000,T=13:00,Δ=1h
}
```

PARAMETER ESTIMATION SYSTEM, PARAMETER ESTIMATION METHOD, AND PARAMETER ESTIMATION PROGRAM RECORDING MEDIUM FOR ESTIMATING PARAMETER AND KERNEL FUNCTIONS BY INCORPORATING MACHINE LEARNING

CROSS REFERENCE TO RELATED APPLICATIONS

This application is a National Stage of International Application No. PCT/JP2018/036731 filed Oct. 1, 2018, claiming priority based on Japanese Patent Application No. 2017-193245, filed Oct. 3, 2017.

TECHNICAL FIELD

This invention relates to a parameter estimation system for estimating a parameter of a function, a parameter estimation method, and a parameter estimation program recording medium.

BACKGROUND ART

There is a demand to estimate a parameter of a function. For instance, it is assumed that the parameter is a population distribution (pedestrian-flow pattern) in a given area and the function is a pedestrian-flow simulator. In this event, there is a demand to calculate the parameter of the pedestrian-flow simulator so as to produce data which is closest to the pedestrian-flow pattern. Herein, when the function is the pedestrian-flow simulator, the "parameter" comprises "the number of persons in a group, where did they come from? (starting point), what time did they come? (starting time instant), where do they go back from? (final arrival point), where do they go through? (transfer point), and a visit duration at the transfer point" in the pedestrian-flow pattern. The starting point and the final arrival point may be the same.

As technique of calculating such parameters of the function, various techniques have been known.

For example, an approximate Bayesian computation (ABC) is known. The ABC is a kind of the Monte Carlo method and is a method of successively calculating parameters having high performance from values of parameters randomly selected. For instance, the ABC of the simplest type comprises the steps of generating pseudo-data from the function, and recognizing that the parameters used in the function are correct if the pseudo-data are close to actual data.

The ABC determines samplings based on a prior knowledge to perform simulation. Then, the ABC filters only those results (pseudo-data) which successfully conform to the actual data.

However, the ABC has a problem that conformation is not easy when the parameters are high dimensional ones. Therefore, a lot of samples are required in the ABC.

Kernel ABC utilizes all samples to express a posterior distribution as a kernel mean weighted with a degree of conformity (see Non-Patent Literature 1). In most cases, there is a motivation to carry out sampling from the posterior distribution. However, the sampling from the kernel mean of the posterior distribution is not easy.

Kernel Herding enables the sampling from the kernel mean of the posterior distribution. Specifically, the sampling by the Kernel Herding can successfully cover a feature of the distribution with a small number of samples and is called super-sampling.

Automatic Relevance Determination (ARD) is an effective tool which leaves important ones from a given parameter set to remove redundancy.

On the other hand, various methods of estimating a pedestrian-flow pattern as a parameter have been proposed.

For instance, Patent Literature 1 discloses a pedestrian-flow analysis system which supports an efficient operation of a city. The pedestrian-flow analysis system disclosed in Patent Literature 1 comprises a region specifying unit, a pedestrian-flow calculation unit, and a display control unit. The region specifying unit specifies a region on a map. The pedestrian-flow calculation unit calculates pedestrian flows relating to the specified region specified by the region specifying unit on the basis of a plurality of pieces of pedestrian-flow information containing time and location information. The display control unit causes, on a map displayed on a display unit, traffic lines of the main pedestrian-flow calculated by the pedestrian-flow calculation unit to be displayed. The pedestrian-flow analysis system comprises a simulation unit. The simulation unit is for calculating the pedestrian flows by means of simulation and, for example, calculates, on the basis of a pedestrian-flow database, the pedestrian flows in a case where an agent is newly generated. Herein, the agent is a virtual entity which is set instead of a real environment in order to generate changes in pedestrian flows and traffic flows on the basis of a change in environment, and means, for example, a change in residents, opening or closing of facilities, and so on.

Patent Literature 2 discloses a time-space variable prediction device which is capable of accurately predicting a value of a time-space variable having temporal and spatial correlations. Patent Literature 2 supposes, as time-series data of the time-space variable, a population distribution, speeds and directions of pedestrian flows and traffic flows, reserves of mineral resources such as gold and diamond, weather data such as a precipitation amount, land prices, or the like. In Patent Literature 2, as an example embodiment, a time-space variable distribution at an unobserved point or in future is estimated and predicted under a condition where the time-series data of a population density distribution are given as observation data.

The time-space variable prediction device disclosed in Patent Literature 2 comprises a learning unit. On the basis of a set of observed data stored in a population density information storage unit, the learning unit learns each of hyper parameters of a kernel function that is a function defining a degree of similarity between observed data, and a sharing rate that is a parameter indicating a degree of contribution of each of a plurality of Gaussian processes to each of the observed data. The learning unit comprises a sharing rate estimation unit, a Gaussian process parameter estimation unit, and a repetition decision unit. On the basis of the set of observed data and each of the hyper parameters of the kernel functions in the plurality of Gaussian processes, the sharing rate estimation unit estimates a unit sharing rate that is a parameter indicating a degree of contribution of each of a plurality of units comprising the plurality of Gaussian processes and a sharing rate that is a parameter indicating a degree of contribution of each of the plurality of Gaussian processes. On the basis of the set of observed data, the unit sharing rate of each of the plurality of units, and the sharing rate of each of the plurality of Gaussian processes, the Gaussian process parameter estimation unit estimates each of the hyper parameters of the kernel function in the Gaussian process for each of the plurality of Gaussian processes. The repetition decision unit repeats estimation by the sharing rate estimation unit and estimation by the Gaussian process parameter estimation unit until a predetermined repetition termination condition is satisfied.

Furthermore, Patent Literature 3 discloses a pedestrian flow survey support system which more efficiently executes pedestrian flow distribution estimation processing of a large scale. The pedestrian flow survey support system disclosed in Patent Literature 3 utilizes a distributed processing platform and generates a large amount of assumptions of the pedestrian flow distribution on the basis of a pedestrian flow model expressing pedestrian flow changes. By evaluating compatibility of the assumptions with measured data, a pedestrian flow distribution is calculated that does not conflict with the measured data. In these circumstances, calculation is parallelized and duplication calculation is eliminated by calculating, for every resembling pedestrian flow models, time evolution processing of the pedestrian flow distribution based on the pedestrian flow model. By parallelized processing for every pedestrian flow models, evaluation against an actual measured value is accelerated by using spatial-temporal indices for the measured data.

The pedestrian flow survey support system disclosed in Patent Literature 3 comprises the distributed processing platform for distributing calculation to a plurality of computers, a pedestrian flow distribution delivery system having a function of delivering pedestrian flow distribution data obtained by estimating a pedestrian flow distribution from pedestrian flow distribution assumption data, and a pedestrian flow measuring instrument for measuring real-time measurement data of the pedestrian flows. In Patent Literature 3, the distributed processing platform prepares a predetermined number of copies of those of pedestrian flow complete survey data which correspond to a current time instant, and randomly slightly shifts a position of each person in each assumption to obtain pedestrian flow assumption data.

Patent Literature 4 discloses a product information providing system for facilitating a product purchase in a real store. In Patent Literature 4, by analyzing and estimating a traffic line based on camera or GPS (Global Positioning System) information, an interest of a visitor is grasped and a recommendation product is determined.

Non-Patent Literature 2 discloses a technical idea which utilizes a mobile space statistics to analyze a round-trip behavior between areas by 250 m mesh.

Non-Patent Literature 3 discloses a technical idea which stochastically estimates a visit spot with a hierarchical round-trip model on the basis of questionnaire information.

CITATION LIST

Patent Literature(s)

PTL 1: WO 2016/067369A1
PTL 2: JP 2017-033198 A
PTL 3: JP 2014-112292 A
PTL 4: JP 2015-022354 A

Non-Patent Literature

NPL 1: Shigeki Nakagome, Shuhei Mano and Kenji Fukumizu (2013) Kernel Approximate Bayesian Computation in Population Genetic Inferences, Statistical Applications in Genetics and Molecular Biology, Volume 12, Issue 6, Pages 667-678

NPL 2: Round-trip Analysis of Pedestrians in Urban Center (No. 2) 'Attributes of Visitors in Urban Center', Nagoya Urban Institute, Research Report, No. 117, 2015

NPL 3: Detailed Analysis of Round-Trip Behavior in Town and Prediction Model for Policy Simulation, Journal of Japan Society of Civil Engineers, Vol. 71, No. 5, 323-335, 2015

SUMMARY OF THE INVENTION

Technical Problem

In the prior art (ABC), there are problems which will presently be described.

A first problem is that accuracy of the parameters decreases in a case where the function to be estimated has a large number of parameters.

In addition, the ABC inefficiently searches for parameter candidates. Accordingly, a second problem is that a useless calculation time is required because simulation is carried out on less significant parameter candidates also.

Furthermore, a third problem is that, when actually unnecessary parameters are searched on the basis of a mistaken knowledge, those parameters are accepted unconditionally.

In the above-mentioned prior arts (Patent Literatures 1 to 4 and Non-Patent Literatures 1 to 3), there are problems which will presently be described.

Patent Literature 1 merely discloses a technical idea of calculating, on the basis of the pedestrian-flow database, the pedestrian flows in case where the agent is newly generated. Accordingly, it is necessary in Patent Literature 1 to preliminarily store, in the pedestrian-flow database, a going-out activity of each individual. In other words, Patent Literature 1 is the technical idea which does not hold in a case where such a going-out activity of each individual is preliminarily unknown.

Patent Literature 2 merely discloses a technical idea of estimating and predicting the time-space variable distribution at the unobserved point or in future under the condition where the time-series data of the population density distribution are given as the observation data. Although Patent Literature 2 describes that the technical idea is applicable to the speeds and the directions of pedestrian flows as the time-series data, how to specifically apply to the speeds and the directions of pedestrian flows is neither disclosed nor suggested.

In Patent Literature 3, the distributed processing platform prepares a predetermined number of copies of those of pedestrian flow complete survey data which correspond to a current time instant, and randomly slightly shifts a position of each person in each assumption to obtain pedestrian flow assumption data. Thus, massive data are required for each person.

In Patent Literature 4, it is possible to obtain a movement track of an individual because the camera or the GPS information is utilized. However, since the technique of Patent Literature 4 leads to individual identification, there is a high possibility of constituting invasion of privacy.

The Kernel ABC disclosed in Non-Patent Literature 1 has a problem that resampling using the kernel mean is impossible, as mentioned above. That is, it is impossible to complete an asymptotic technique.

In Non-Patent Literature 2, it is possible to protect privacy because population distribution information such as a mobile space statistics is used. However, it is difficult for the method disclosed in Non-Patent Literature 2 to estimate a detailed round-trip behavior because analysis granularity is coarse.

The method disclosed in Non-Patent Literature 3 analyzes a round-trip behavior using the population distribution and the questionnaire information on the basis of a stochastic behavior model. However, it is impossible for such an analysis method to grasp a detailed relationship between facilities, resulting in insufficient information to utilize an analyzed result thereof to town planning.

It is an object of this invention to provide a parameter estimation system and a parameter estimation method which are capable of resolving the above-mentioned problems.

Solution to Problem

As an aspect of the present invention, a parameter estimation system is for estimating a parameter θ of a function for producing data y, and comprises a machine learning device for determining, by repetitive learning, the parameter θ to be set to the function, wherein the machine learning device comprises a first sample acquisition unit configured to acquire N (where N represents an integer which is not less than two) samples $\theta_i$ (1≤i≤N) of the parameter θ from a prior distribution P; a function execution unit configured to acquire N data $y_i$ from the function by successively supplying the N samples $\theta_i$ to the function, respectively; a degree-of-similarity calculation unit configured to calculate N degrees of similarity $w_i$ between the N data $y_i$ and correct data y* using a kernel function k; a kernel mean construction unit configured to construct a kernel mean μ of a posterior distribution based on the N degrees of similarity $w_i$, the N samples $\theta_i$, and the kernel function k; a second sample acquisition unit configured to acquire T (where T represents an integer which is not less than two) new samples $\theta_t$ (1≤t≤T) of the parameter θ based on the kernel mean μ and the kernel function k; and a sample evaluation unit configured to determine whether a difference $\|y_k-y^*\|$ between new data $y_k$ and the correct data y* is less than a predetermined threshold value ε, the new data $y_k$ being obtained from the function by supplying the function with one sample $\theta_k$ selected from the T new samples $\theta_t$; wherein the sample evaluation unit estimates and produces the selected sample $\theta_k$ as the parameter θ when it is determined that the difference $\|y_k-y^*\|$ is less than the predetermined threshold value ε.

As another aspect of the present invention, a parameter estimation method in a parameter estimation system for estimating a parameter θ of a function, is for determining, by repetitive learning, the parameter θ to be set to the function, from samples of the parameter θ, using the function for producing data y, the method comprising acquiring, in a first sample acquisition unit, N (where N represents an integer which is not less than two) samples $\theta_i$ (1≤i≤N) of the parameter θ from a prior distribution P; acquiring, in a function execution unit, N data $y_i$ from the function by successively supplying the N samples $\theta_i$ to the function, respectively; calculating, in a degree-of-similarity calculation unit, N degrees of similarity $w_i$ between the N data $y_i$ and correct data y* using a kernel function k; constructing, in a kernel mean construction unit, a kernel mean μ of a posterior distribution based on the N degrees of similarity $w_i$, the N samples $\theta_i$, and the kernel function k; acquiring, in a second sample acquisition unit, T (where T represents an integer which is not less than two) new samples $\theta_t$ (1≤t≤T) of the parameter θ based on the kernel mean μ and the kernel function k; and determining, in a sample evaluation unit, whether a difference $\|y_k-y^*\|$ between new data $y_k$ and the correct data y* is less than a predetermined threshold value ε, the new data $y_k$ being obtained from the function by supplying the function with one sample $\theta_k$ selected from the T new samples $\theta_t$; wherein, in the sample evaluation unit, the selected sample $\theta_k$ is estimated and produced as the parameter θ when it is determined that the difference $\|y_k-y^*\|$ is less than the predetermined threshold value ε.

Advantageous Effects of Invention

According to this invention, it is possible to estimate a high-dimensional parameter of a function and to reduce a calculation time.

DESCRIPTION OF EMBODIMENTS

Figure 1:
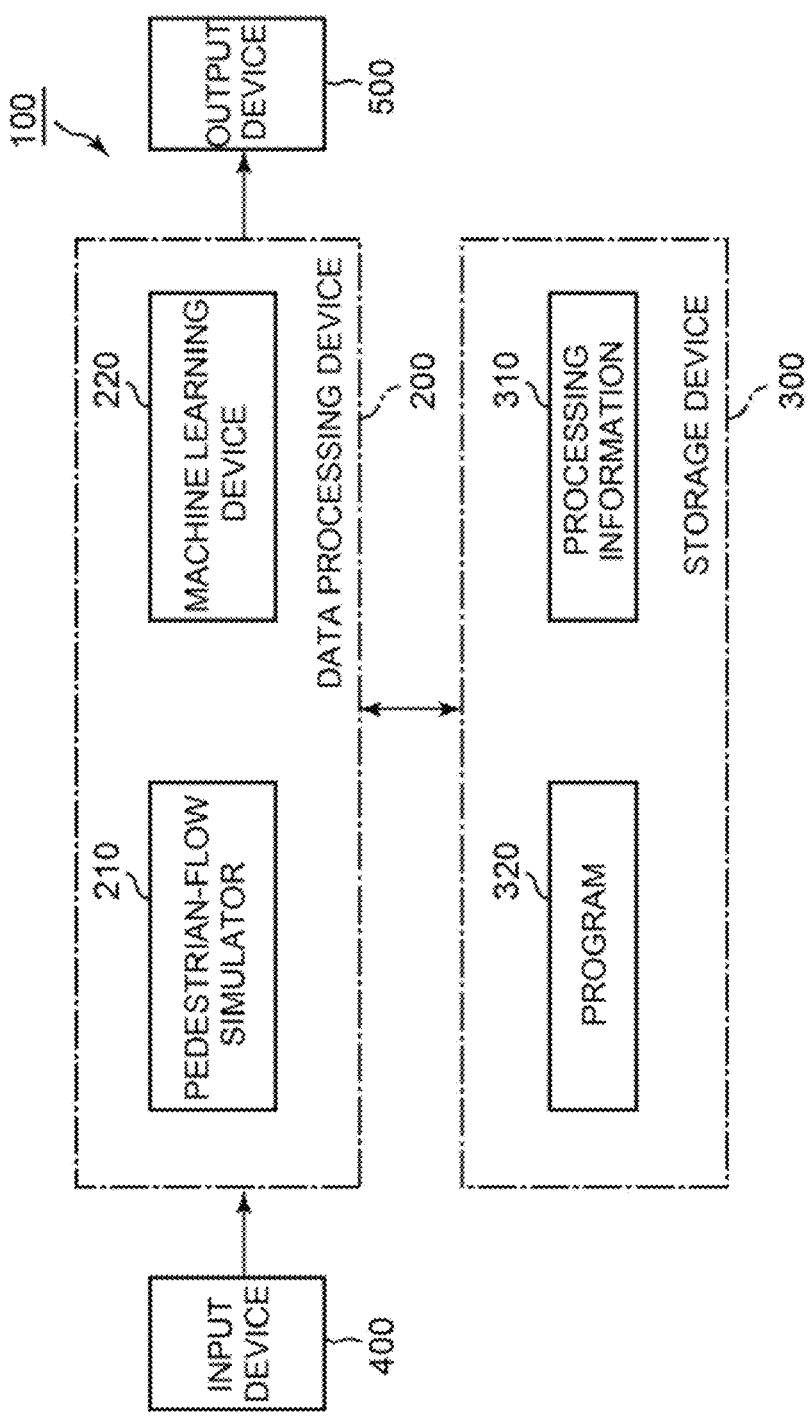
FIG. 1 is a block diagram for illustrating a configuration of a pedestrian-flow pattern estimation system according to an example embodiment of the present invention.

First, in order to facilitate an understanding of the present invention, meanings of terms used in the present description will briefly be described.

An Approximation Bayesian Computation (ABC) is a kind of the Monte Carlo method and is a method of successively calculating parameters having high performances from values of parameters randomly selected. For instance, the ABC generates pseudo-data from a function and recognizes that a parameter used in the function is correct if the pseudo-data are close to actual data.

In other words, the ABC is a likelihood-free method for Bayesian inference in which a rejection algorithm is applied to a difference between observation data and data obtained from the function.

Kernel ABC utilizes all samples and expresses a distribution as a kernel mean weighted with a degree of conformity.

A kernel method is a methodology for constructing a mapping to a high-dimensional space. The kernel method maps data to a high-dimensional reproducing kernel Hilbert space (generally, an infinite dimension) to convert the data into easily-analyzable data. The Hilbert space is a vector space and is a set which has an inner product and is complete.

That the Hilbert space H having a function on a set $\Omega$ as elements is a reproducing kernel Hilbert space (RKHR) means that, for any $x \in \Omega$, there exists $\varphi_x \in H$ and, for any $f \in H$, the following is satisfied:

$<f, \varphi_k> = f(x)$.

Herein, $\varphi_k$ is called a reproducing kernel.

Kernel Herding successfully utilizes a feature of the distribution of the kernel mean and selects a representative point with less overlap as a super sample. That is, the Kernel Herding expresses a suitable setting distribution using less sample points.

In ARD, by adjusting a hyper parameter, most of values of parameters take zero in sampling from prior distribution so as to delete superfluous ones. Normally, this is achieved by introducing a Dirichlet distribution or a beta distribution as the prior distribution. Explaining an example of the Dirichlet distribution, when the hyper parameter associated therewith takes a small value, most of samples from the distribution take a value almost near to zero, and a force to explain a phenomenon with less parameters is exerted.

In other words, when it is desired to control redundancy of the parameters, the samples of the parameters are acquired from the Dirichlet distribution or the beta distribution. A hyper parameter for controlling the redundancy of the parameters is present in the Dirichlet distribution and the beta distribution. By changing a value of the hyper parameter, redundancy of the samples of the parameter is adjusted. For instance, when the hyper parameter is set so as to eliminate the redundancy, only a very small number of elements of the samples have a value of non-zero whereas a lot of elements have a value of zero. Consequently, the elements having the value of zero have no substantial influence. Thus, the obtained kernel mean of a posterior distribution is extremely reduced in redundancy.

Related Art

In order to facilitate an understanding of the present invention, a related art and problems thereof will be described.

It is assumed that, when a fact (truth) of a question is given, it is desired to know a set of parameters of a function which generate data sufficiently close to the fact (truth). Although it is desired to apply the Bayes' rule, a function cannot be evaluated. However, by the following expression, it is possible to carry out sampling from a likelihood p (y|θ) of the function on the basis of a prior probability π(θ):

$$q(\theta \mid y) = \frac{p(y \mid \theta)\pi(\theta)}{\int p(y \mid \theta)\pi(\theta)d\theta} \qquad \text{[Math. 1]}$$

Therefore, it is supposed to use a framework of the ABC. Table 1 shows an algorithm of the ABC.

TABLE 1

Algorithm 2 Likelihood-free rejection sampler 2
for i = 1 to N do
   repeat
      Generate θ' from the prior distribution π(•)
      Generate z from the likelihood f(•|θ')
   until ρ{η(z),η(y)} ≤ ε
   set $\theta_i$ = θ',
end for where the parameters of the algorithm are η, a function on $\mathscr{S}$ defining a statistic which most often is not sufficient, ρ>0, a distance on η($\mathscr{S}$), ε>0, a tolerance level.

However, the ABC has problems as follows.

A first problem is that, when data have a high dimension, a parameter does not easily satisfy a tolerance level and the algorithm does not come to an end in a practical time.

A second problem is that performance of the ABC rapidly decreases when the parameters have a high dimension.

A third problem is that the number of executions cannot be reduced because a long time is required to evaluate the function.

DESCRIPTION OF AN OUTLINE OF AN ALGORITHM ACCORDING TO THIS INVENTION

According to this invention, the Kernel ABC is used in order to solve the first and the second problems whereas the Kernel Herding is used in order to solve the third problem.

The outline of the algorithm of this invention is as follows:

A1. To fetch, from a prior distribution, a set of parameters N times;

A2. To generate data from the function N times by using the N set of parameters;

A3. Kernel ABC

To infer the parameter of the function that generates data close to observation data by calculating the kernel mean of a posterior distribution;

A4. Kernel Herding

To fetch, from the kernel mean of the posterior distribution, beneficial samples T times for the next repetition; and A5. To repeat the operation from A2 for the purpose of convergence.

Next, description will proceed to the Kernel ABC.

The Kernel ABC is based on a Kernel Bayes' rule and is a non-parametric implementation of the Bayes' rule.

B1. To fetch a set of parameters from the prior distribution N times;

B2. To acquire N pieces of data obtained by evaluating the function by supplying a set of the parameters to the function N times;

B3. To calculate a degree-of-similarity (weight) between true data and the data obtained by evaluating the respective functions;

B4. To calculate a kernel mean of a posterior distribution of the parameter according to the following numerical expression by averaging the set of parameters in B1 with the degree-of-similarity (weight) thereof:

$$\sum_{t=1}^{n} v_j k_X(\bullet, X_t), v = (G_Y + n\varepsilon_n I_n)^{-1} k_Y(y).$$ [Math. 2]

Next, the kernel mean will be described.

It is assumed that X is a random variable which takes a value on a measure space $\Omega$, k is a positive-definite kernel on the measure space $\Omega$, and H is a reproducing kernel Hilbert space (RKHS) which is defined by the positive-definite kernel. In this event, the kernel mean is calculated by the following expression:

$$m_p := E[\Phi(X)] = E[k(\cdot, X)] = \int k(\cdot, x) dP(x) \in H_k$$ [Math. 3]

By a characteristic kernel, it is possible to uniquely embed a probability distribution into the reproducing kernel Hilbert space. The characteristic kernel is, for example, a Gaussian kernel or a Laplace kernel.

Next, description will proceed to an advantage of use of the kernel mean and the Kernel Bayes' rule. It is possible to non-parametrically apply the Bayes' rule without supposing a parametric model between variables and a density function. Accordingly, the kernel mean representing the probability distribution is non-parametrically estimated from the data.

Next, description will proceed to the Kernel Herding.

An output of the Kernel ABC is the kernel mean of the posterior distribution in the reproducing kernel Hilbert space but the output itself is not a posterior distribution. It is therefore impossible to use a sampling method from the posterior distribution represented by the Markov chain Monte Carlo method. However, the Kernel Herding enables the sampling from the posterior distribution.

Furthermore, samples from the Kernel Herding are called super-samples which properly reflect a feature of the distribution.

It is construed that the Kernel Herding carries out the sampling by hungrily minimizing the following error.

$$\mathcal{E}_T^2 = \left\| \mu_p - \frac{1}{T} \sum_{t=1}^{T} \phi(X_t) \right\|_{\mathcal{H}}^2$$ [Math. 4]
$$= \mathbb{E}_{X, X' \sim p}[k(X, X')] - \frac{2}{T} \sum_{t=1}^{T} \mathbb{E}_{X \sim p}[k(X, X_t)] +$$
$$\frac{1}{T^2} \sum_{t,t'=1}^{T} k(X_t, X_{t'}).$$

The Kernel Herding acquires the samples from an area having a high density in the distribution. That is, it is supposed that a mode of the distribution is searched. In addition, the next samples are acquired apart from an area where the samples are once acquired.

The above is summarized as follows.

The Kernel ABC can process relatively high dimensional parameters, can process relatively high dimensional data (data obtained by evaluating a function/true data of the question), and has manageable computational complexity.

The Kernel Herding can reduce the required number of times of evaluating a function.

Explanation of the Summary of the Invention

In the following, a case where the function is a pedestrian-flow simulator will be described by way of example. As a matter of course, however, the present invention is not limited to the case where the function is the pedestrian-flow simulator. As regards application to the pedestrian-flow simulator, in the first place, data assimilation of the pedestrian-flow simulator regarding a time series of the population distribution such as a mobile space statistics has not been attempted so far. In that event, there are following problems which are dealt with in a proposed technique according to the present invention.

1) The pedestrian-flow simulator is a multi-agent simulator and, in most cases, takes a very long calculation time for simulation.

In comparison with this, this proposal method can achieve the data assimilation by simulation of a number of more few times by using the Kernel Herding. This is because the Kernel Herding efficiently acquires samples of an important parameter having more pieces of information.

Regarding the above, the error converges at O(1/T). On the other hand, in acquisition of the samples of the parameter by means of the Monte Carlo method or the like, convergence is slower, at O(1/√T).

2) With respect to other data assimilations, not the pedestrian-flow simulator, it is understood that the Bayesian inference using the ABC or the like does not work well when the dimension of the parameter is a high dimension.

In contrast, this proposed technique copes with the high dimensional parameter because the Kernel ABC carries out the Bayesian inference on the reproducing kernel Hilbert space.

3) In a case where prior knowledge is not correct, a prior distribution may be constructed assuming a pedestrian-flow pattern which does not exist in a particular area. For instance, in Ginza, a pedestrian-flow pattern is assumed which includes having lunch at Yoshinoya, buying a watch at Rolex, buying a car at Ferrari, having supper at Matsuya, and so on. The related art does not have a mechanism for automatically deleting, by means of an algorithm, such a pedestrian-flow pattern which is unlikely to exist.

In contrast, this proposed technique introduces sparseness for deleting such a pattern by means of the ARD.

As regards the algorithm, this proposed technique makes it possible to carry out point inference in a case where the function cannot be evaluated.

The related art can carry out the Bayesian inference (ABC or the like) in the case where the function cannot be evaluated. That is, it is possible to thereby calculate a correct posterior distribution. However, the ABC cannot carry out the point inference under a situation where there is one true value, in the case where the function cannot be evaluated.

In comparison with this, this proposal method achieves the point inference by repeatedly applying (Kernel ABC+ Kernel Herding) in a state of considering the samples from the posterior distribution acquired by the (Kernel ABC+ Kernel Herding) as samples from the prior distribution.

By first-time application, the posterior distribution represented by the following numerical expression is obtained:

$$P(\theta|y)_1 \propto l(y|\theta)\pi(\theta) \quad \text{[Math. 5]}$$

By second-time application with P(θ|y) assumed as the prior distribution, the following numerical expression is obtained:

$$P(\theta|y)_2 \propto l(y|\theta)P(\theta|y)_1 \quad \text{[Math. 6]}$$

This means:

$$P(\theta|y)_2 \propto l(y|\theta)l(y|\theta)\pi(\theta) \quad \text{[Math. 7]}$$

By N-th time application, the following is obtained:

$$P(\theta|y)_N \propto l(y|\theta)^N \pi(\theta) \quad \text{[Math. 8]}$$

That is, the function l(y|θ) is raised to the N-th power to have a stronger influence whereas influence of the prior distribution π(θ) decreases. Acquisition of θ which maximizes P(θ|y) after repeating this the infinite number of times coincides with acquisition of θ which maximizes l(y|θ) because the influence of π(θ) is deleted. That is, it is understood that acquisition of θ which maximizes P(θ|y) by repeating, on the same data, the Bayesian inference related to the parameter the infinite number of times is coincident with the maximum likelihood method of the point inference. Taking the above into account, by using the ABC which is the technique of carrying out the Bayesian inference when the function cannot be evaluated, it is possible to execute the maximum likelihood method without the function. This is called a Recursive ABC-MLE. Although the kernel ABC is used within this algorithm in the present specification, any technique may be used as far as the posterior distribution can be calculated without any function. In addition, acquisition of θ which maximizes P(θ|y) within this algorithm becomes possible by a characteristic, called mode-seeking, of the Kernel Herding. However, the technique of acquisition is not necessarily the Kernel Herding and may be any technique having a characteristic of sampling a mode value.

The Kernel Herding efficiently acquires, from the posterior distribution, the samples of the important parameter having a greater amount of information. In this regard, the error converges at O(1/T).

On the other hand, in a case where the repetition of the above-mentioned Bayesian inference is carried out by acquiring the samples of the parameter by means of the Markov chain Monte Carlo method which is the technique of the related art, convergence is slower, at O(1/√T).

An essence of this algorithm is to enable the maximum likelihood method to be performed when the function cannot be evaluated. It is conceivable that this algorithm is applicable not only to estimation of the pedestrian-flow pattern which will later be described but also to estimation of the parameter of the following functions.

1) To estimate, in conformity with data, a parameter of an alpha stationary distribution which is often used in appropriately modeling variance (volatility) of a financial time-series price fluctuation such as a stock price.

2) To estimate, in conformity with data, a parameter in a model describing temporal development of a population of a living thing such as a fly.

3) To estimate a parameter (such as a mutation rate) of a model so as to realize a genetic diversity of given data in population genetics.

It is noted that this algorithm does not correspond to an abstract idea although it is a software-related invention. This is because this algorithm exhibits an effect of decreasing a calculation time and therefore improves (upgrades) a computer-related art.

Example Embodiment

In an example embodiment which will hereinafter be described, description will be made as regards a case where the present invention is applicable to a pedestrian-flow pattern estimation system. However, the present invention is generally applicable to a parameter estimation system for estimating a parameter of a function, as mentioned above. FIG. 1 is a block diagram for illustrating a configuration of the pedestrian-flow pattern estimation system 100 according to one example embodiment of the present invention.

The illustrated pedestrian-flow pattern estimation system 100 comprises a data processing device 200 for processing data, a storage device 300 for storing a program and data which will later be described, an input device 400 for inputting data, and an output device 500 for outputting data.

The output device 500 comprises a display device such as a LCD (Liquid Crystal Display) or a PDP (Plasma Display Panel) and a printer. The output device 500 has a function of displaying various kinds of information, such as an operation menu, and printing-out a final result in response to instructions from the data processing device 200.

The storage device 300 comprises a hard disk and a memory such as a read-only memory (ROM) and a random access memory (RAM). The storage device 300 has a function of storing processing information 310 required for various types of processing in the data processing device 200 and a program 320.

The data processing device 200 comprises a microprocessor such as a MPU (micro processing unit) or a central processing unit (CPU). The data processing device 200 has a function of implementing, by reading the program 320 out of the storage device 300, various processing units for processing data in accordance with the program 320.

The data processing device 200 comprises a pedestrian-flow simulator 210 and a machine learning device 220. In this example embodiment, description will be made as regards a case where the function is the pedestrian-flow simulator 210 by way of example. However, the present invention is generally applicable to other functions, as mentioned above.

In the illustrated pedestrian-flow estimation system 100, it is assumed that data required for an algorism and data of a population distribution such as a device mobile space statistics in an area and at a time instant for which estimation of a pedestrian flow is desired. This is called correct data y*.

Figure 2:
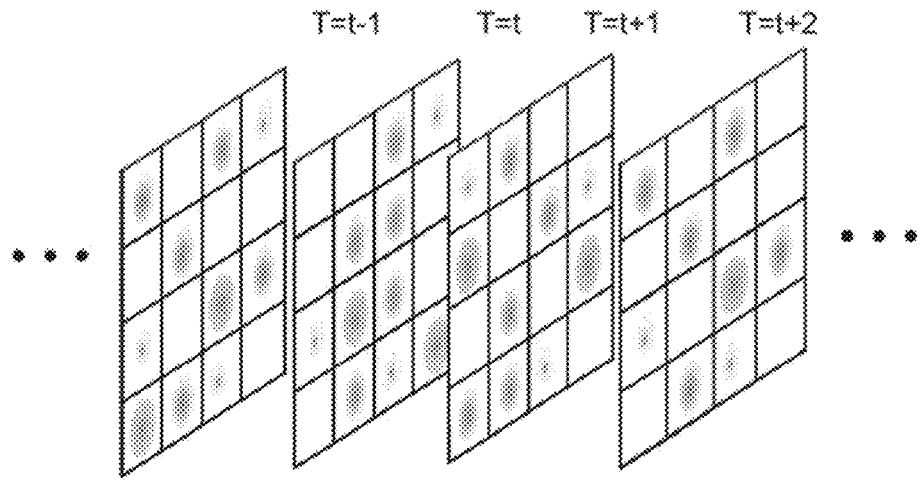
FIG. 2 is a view for illustrating an example of population temporal distribution data representing correct data.

FIG. 2 is a view for illustrating an example of population temporal distribution data representing the correct data y*. The population temporal distribution data represents population distributions at every time instant T= . . . t−1, t, t+1, t+2, . . . The time instant T is a time instant, for example, at every thirty minutes. Such population temporal distribution data can be obtained, for example, by statistics information or a SNS (Social Networking Service). Herein, the SNS is a membership on-line service that provides various functions for maintaining and promoting a social connection between persons. The storage device 300 saves the correct data y* as the processing information 310.

The pedestrian-flow pattern estimation system 100 is a system for estimating pedestrian flows which are movements per a pedestrian-flow group in a town. As described above, the present invention is generally applicable to the parameter estimation system for estimating the parameter of the function.

The pedestrian-flow simulator 210 can simulate pedestrian-flow patterns in any area and at any time instant.

Specifically, in the pedestrian-flow simulator 210, information of the population distribution at each spot and each time instant, map information and facility information in the town are installed.

Figure 3:
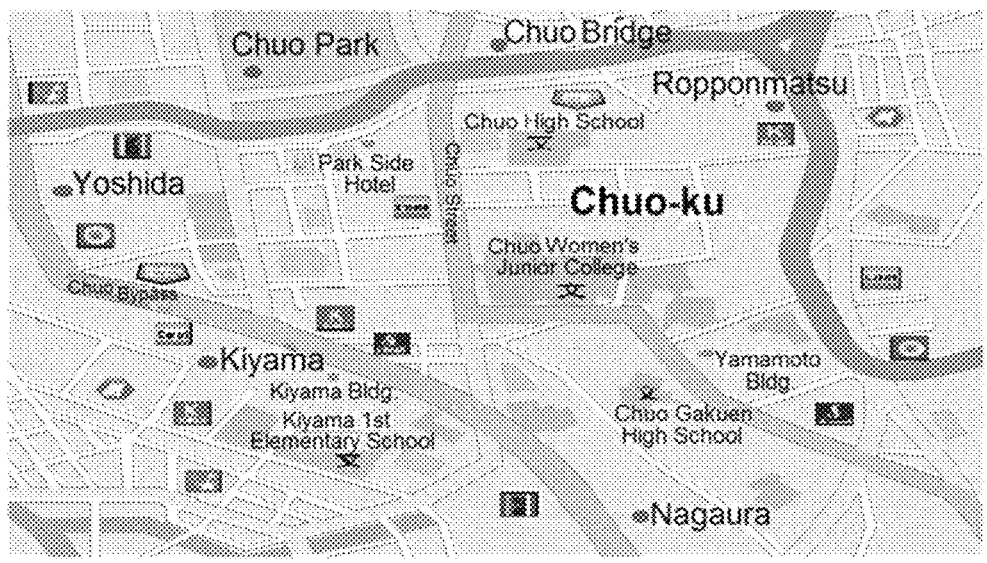
FIG. 3 is a view for illustrating one example of map information and facility information (map/building data) which are installed (set) in a pedestrian-flow simulator for use in the pedestrian-flow pattern estimation system illustrated in FIG. 1.

FIG. 3 is a view for illustrating one example of the map information and the facility information (map/building data) which are installed (set) in the pedestrian-flow simulator 210. The storage device 300 saves the map information and the facility information as the processing information 310. The map information and the facility information are set in the pedestrian-flow simulator 210 as will later be described.

The pedestrian-flow simulator 210 produces population distribution data y at each spot and each time instant based on samples of a parameter θ which define a pedestrian flow pattern and which are supplied from the machine learning device 220 as will later be described. Herein, it is noted that the population distribution data y obtained by the pedestrian-flow simulator 210 do not normally conform to the correct data y*. This is because nobody knows a pedestrian-flow pattern which satisfies the correct data y*. In general, the function according the present invention produces the data y based on the samples of the parameter θ.

Figure 4:
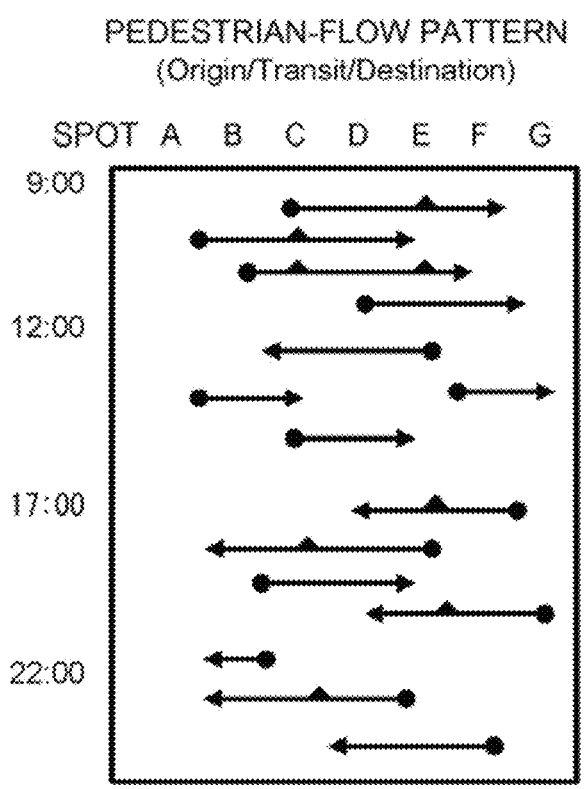
FIG. 4 is a view for illustrating one example of a pedestrian-flow pattern.

FIG. 4 illustrates one example of the pedestrian-flow pattern. The pedestrian-flow pattern illustrated in FIG. 4 shows a pedestrian-flow pattern at and after a time instant of 9:00 at spots A, B, C, D, E, F, and G.

The parameter θ includes, for each group, information of a starting point, a starting time instant, a transfer point, a visit duration, a destination, and the number of persons.

The machine learning device 220 determines the parameter θ to be set in the pedestrian-flow simulator 210 by means of repetition learning as will later be described.

Figure 5:
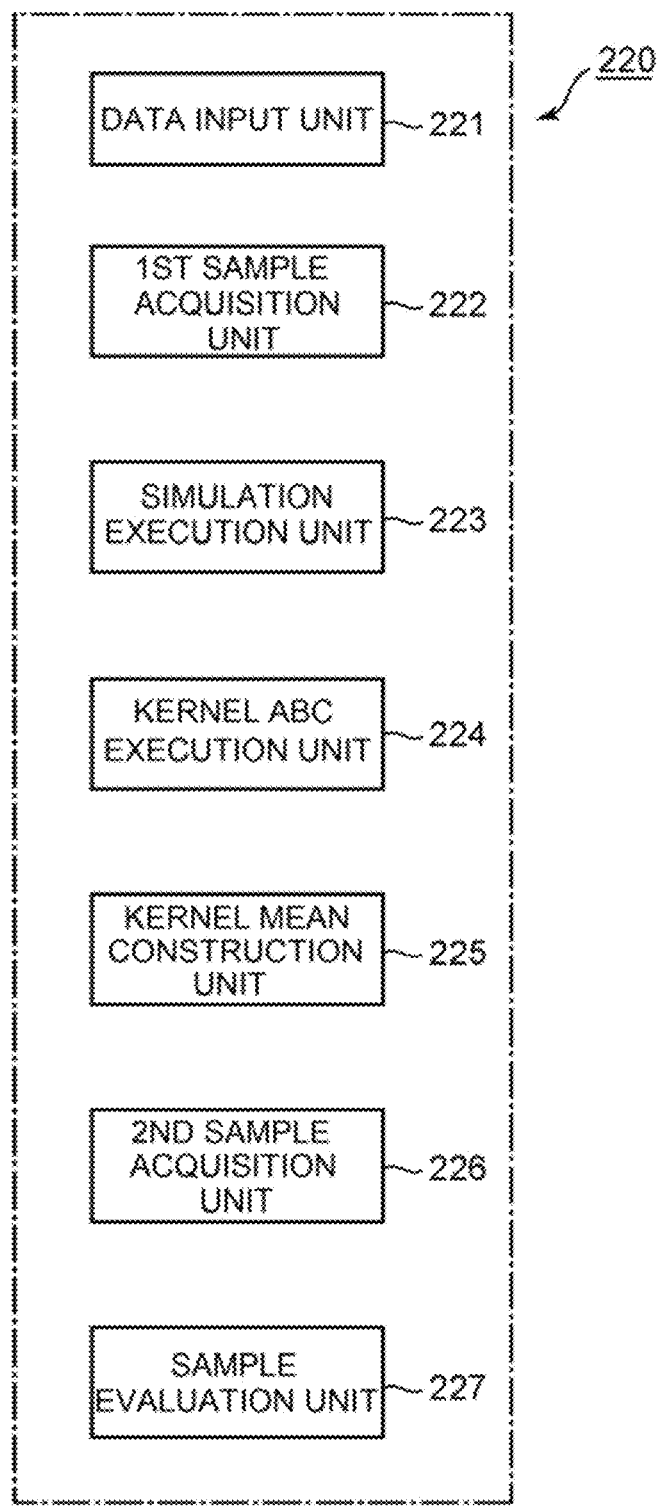
FIG. 5 is a block diagram for illustrating main processing units implemented by a machine learning device for use in the pedestrian-flow pattern estimation system illustrated in FIG. 1.

FIG. 5 is a block diagram for illustrating main processing units implemented by the machine learning device 220.

The machine learning device 220 comprises a data input unit 221, a first sample acquisition unit 222, a simulation execution unit 223, a Kernel ABC execution unit 224, a kernel mean construction unit 225, a second sample acquisition unit 226, and a sample evaluation unit 227. In addition, the Kernel ABC execution unit 224 serves as a degree-of-similarity calculation unit.

Referring now to FIGS. 6 through 12, description will proceed to operations of the respective processing units.

Figure 6:
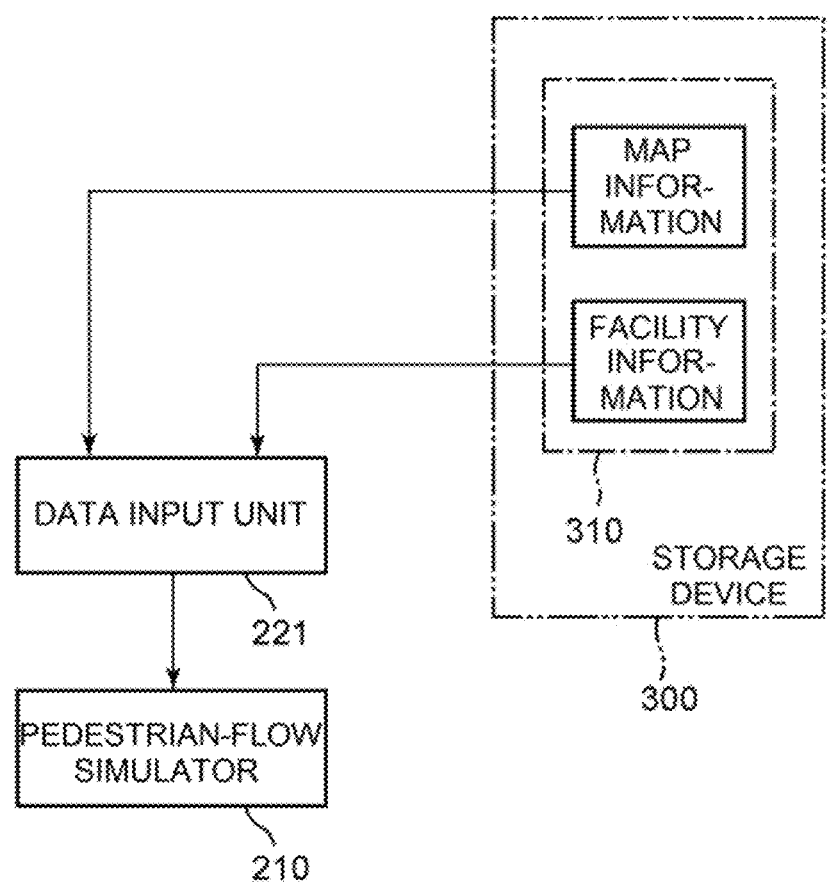
FIG. 6 is a view for describing an operation of a data input unit for use in the machine learning device illustrated in FIG. 5.

Referring to FIG. 6, an operation of the data input unit 221 will be described.

As shown in FIG. 6, the data input unit 221 supplies the pedestrian-flow simulator 210 with information of an area for which the pedestrian-flow pattern is desired to be estimated. Specifically, the storage device 300 saves, in the processing information 310, the map information and the facility information as an area information as described above. The data input unit 221 reads the map information and the facility information out of the storage device 300 and supplies (sets) these information to the pedestrian-flow simulator 210.

In this example, the data input unit 221 reads the map information and the facility information saved in the storage device 300 and sets these information to the pedestrian-flow simulator 210. However, the map information and the facility information which are supplied from the input device 400 may be directly set to the pedestrian flow simulator 210.

Figure 7:
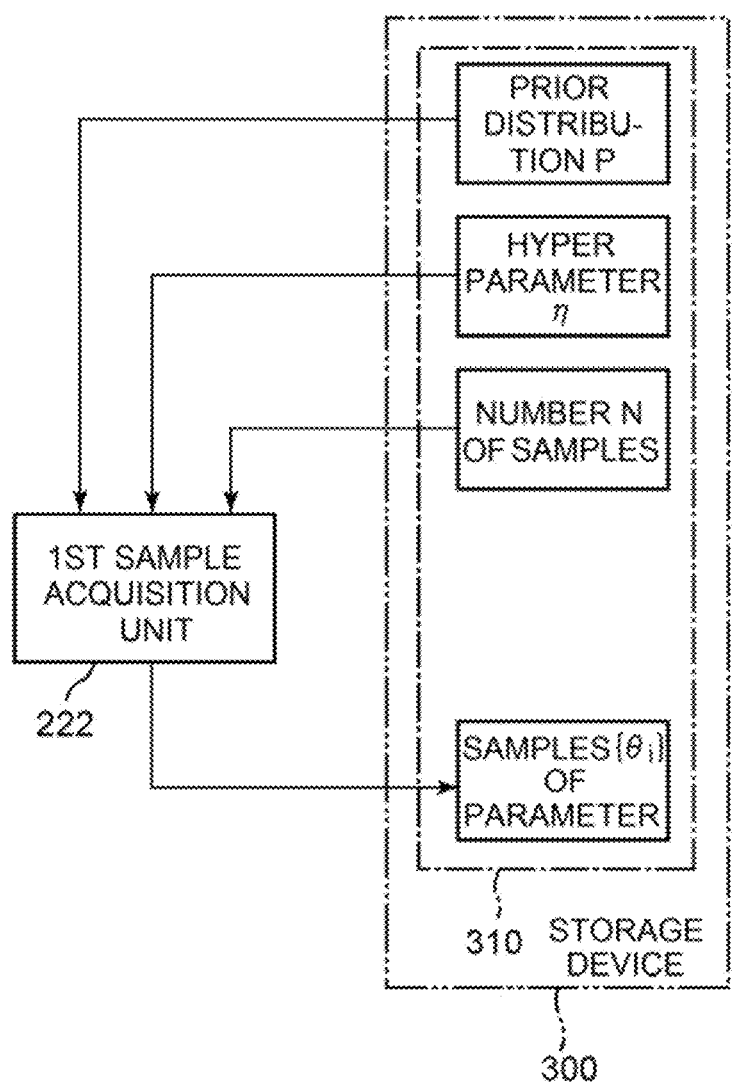
FIG. 7 is a view for describing an operation of a first sample acquisition unit for use in the machine learning device illustrated in FIG. 5.

Referring to FIG. 7, description will proceed to an operation of the first sample acquisition unit 222. The first sample acquisition unit 222 may also be called a "sample acquisition unit from a prior distribution". The first sample acquisition unit 22 is concerned with ARD.

As shown in FIG. 7, the storage device 300 stores, as the processing information 310, a prior distribution P, a hyper parameter η of the prior distribution P, and the number N of samples from the prior distribution P. The prior distribution P comprises a mixture model so that the total number of the samples of any desired parameter is equal to N or an appropriate prior distribution which can reflect a case where a structure of a solution is equivalent to the mixture model.

By adjusting the hyper parameter η of the prior distribution P, whether or not sparseness is introduced into a final solution of this algorithm is determined.

The first sample acquisition unit 222 fetches samples from the prior distribution as the following numerical expression:

$$\theta_i \sim P(\theta|\eta) \qquad \text{[Math. 9]}$$

Accordingly, the first sample acquisition unit 222 acquires N samples $\{\theta_i\}$ (i=1 to N) of the parameter for the pedestrian-flow simulator 210. The acquired N samples $\{\theta_i\}$ of the parameter are saved in the storage device 300 as the processing information 310.

Figure 8:
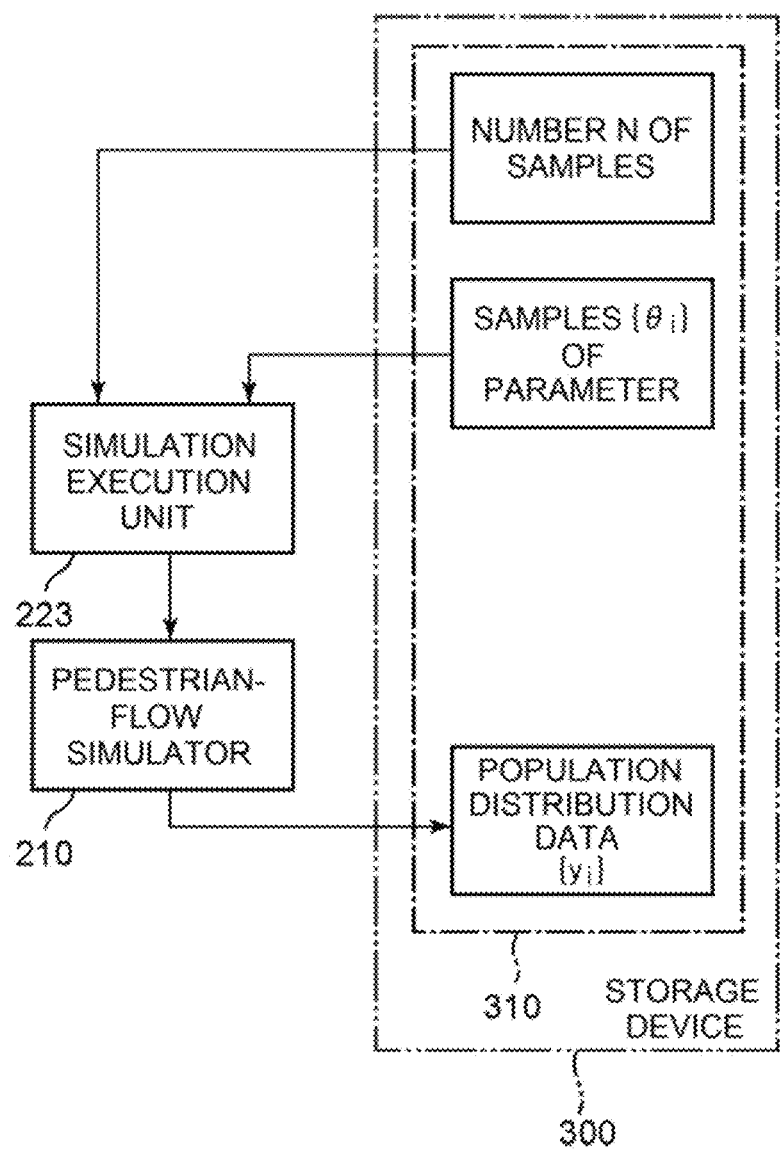
FIG. 8 is a view for describing an operation of a simulation execution unit for use in the machine learning device illustrated in FIG. 5.

Referring to FIG. 8, description will proceed to an operation of the simulation execution unit 223.

As shown in FIG. 8, the storage device 300 saves the number N of the samples described above and the N samples $\{\theta_i\}$ of the parameter as the processing information 310.

The simulation execution unit 223 supplies the sample $\{\theta_i\}$ of the parameter N times to the pedestrian-flow simulator 210 to obtain N population distribution data $\{y_i\}$ (1≤i≤N) from the pedestrian-flow simulator 210. The obtained N population distribution data $\{y_i\}$ are saved in the storage device 300 as the processing information 310.

Figure 9:
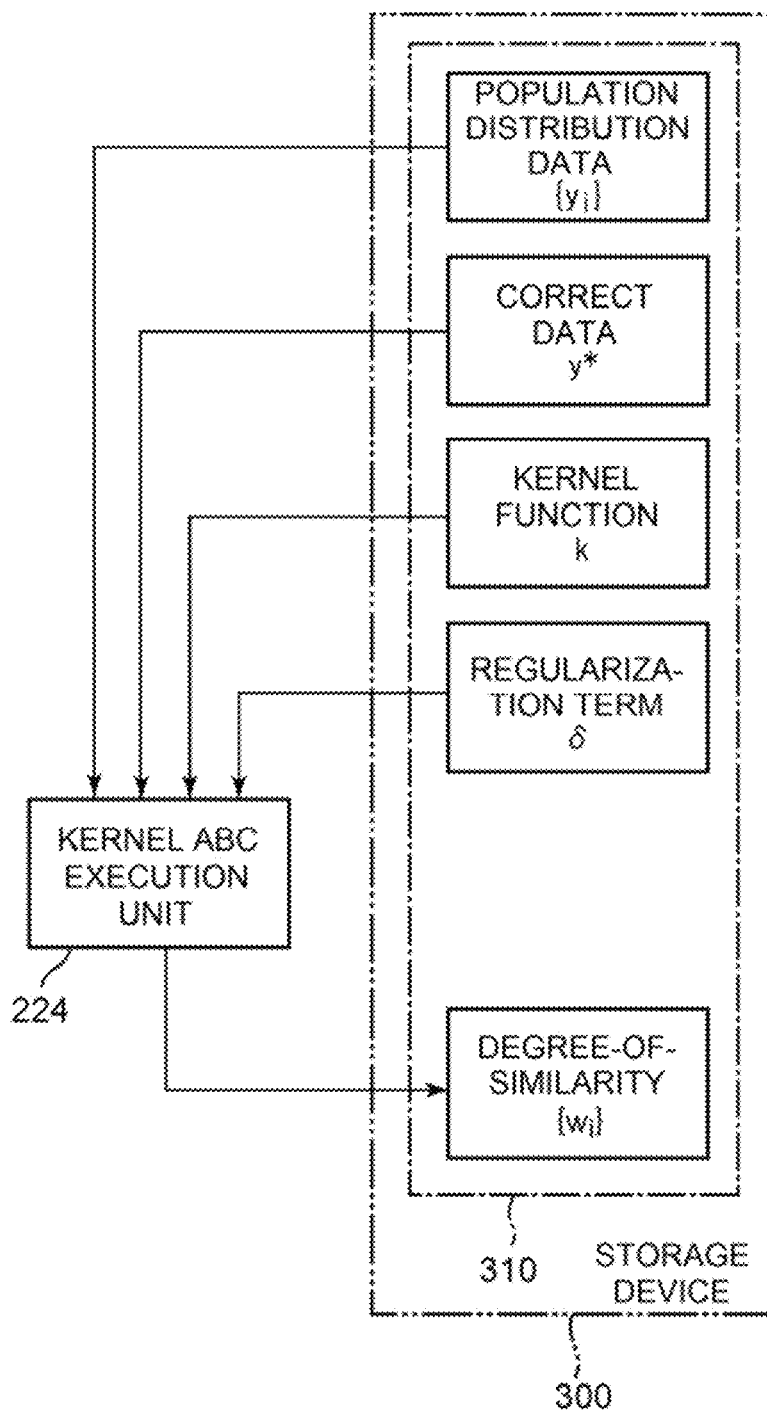
FIG. 9 is a view for describing an operation of a Kernel ABC execution unit (degree-of-similarity calculation unit) for use in the machine learning device illustrated in FIG. 5.

Referring to FIG. 9, description will proceed to an operation of the Kernel ABC execution unit (degree-of-similarity calculation unit) 224.

As shown in FIG. 9, the storage device 300 saves the N population distribution data $\{y_i\}$ described above, the correct data y* described above, a kernel function k, and a regularization term δ as the processing information 310.

The Kernel ABC execution unit 224 performs calculation represented by the following numerical expression to obtain degrees of similarity $\{w_i\}$ (1≤i≤N) between the correct data and the respective simulated population distribution data $\{y_i\}$: [Math. 10]

$$w_i = \Sigma_{j=1}^{N}((G+\delta NI)^{-1})_{ij}k(y_j,y^*)$$

where G represents a Gram matrix, and I represents an identity matrix. The N degrees of similarity $\{w_i\}$ thus obtained are saved in the storage device 300 as the processing information 310.

In this example, the Kernel ABC execution unit 224 for calculating the degrees of similarity $\{w_i\}$ by means of a Kernel ABC algorithm is used as the degree-of-similarity calculation unit. However, the present invention is not limited thereto. That is, an algorithm used in the degree-of-similarity calculation unit may be any algorithm as far as the N degrees of similarity $\{w_i\}$ are produced so as to construct a kernel mean of a posterior distribution which will later be described.

Figure 10:
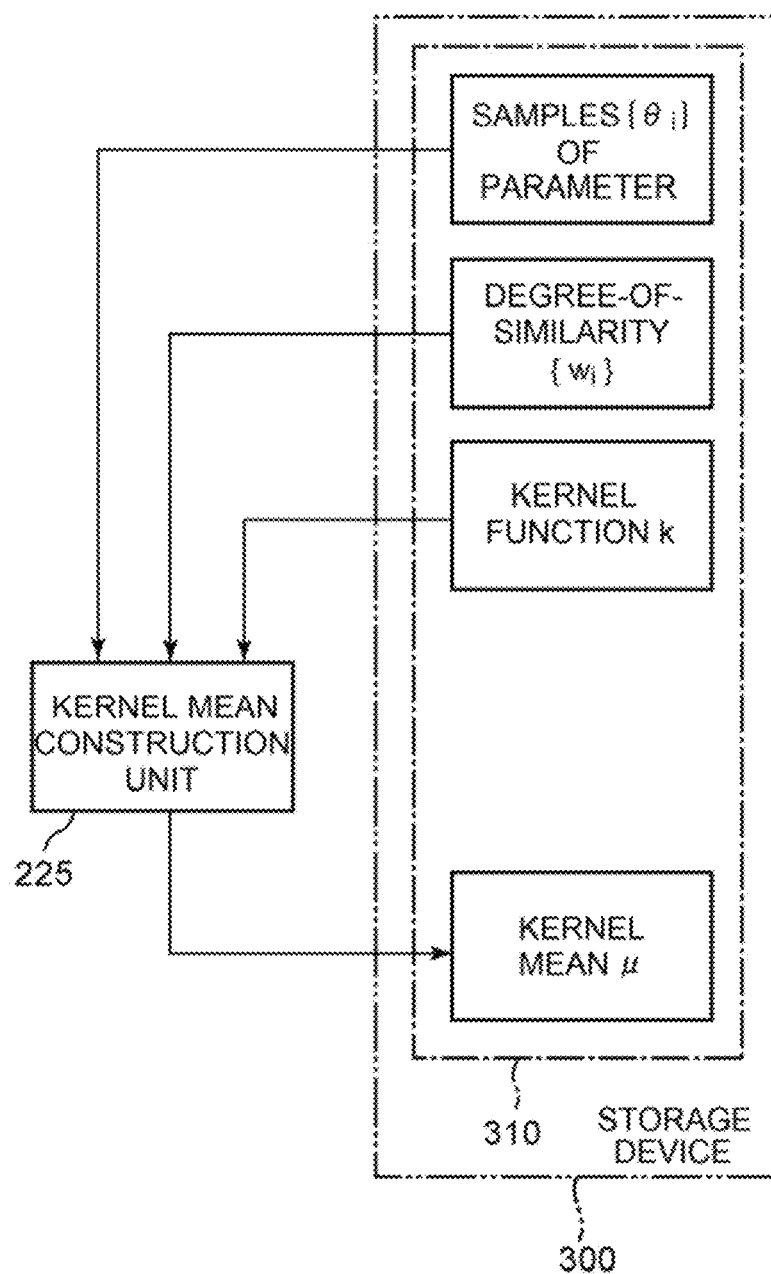
FIG. 10 is a view for describing an operation of a kernel mean construction unit for use in the machine learning device illustrated in FIG. 5.

Referring to FIG. 10, description will proceed to an operation of the kernel mean construction unit 225.

As shown in FIG. 10, the storage device 300 saves the N samples $\{\theta_i\}$ of the parameter described above, the N degrees of similarity $\{w_i\}$ described above, and the kernel function k described above as the processing information 310.

The kernel mean construction unit 225 performs calculation represented by the following numerical expression to obtain the kernel mean μ of the posterior distribution:

$$\mu = \sum_{i=1}^{M} w_i k(\cdot, \theta_i) \quad \text{[Math. 11]}$$

The kernel mean μ thus obtained is saved in the storage device 300 as the processing information 310.

Figure 11:
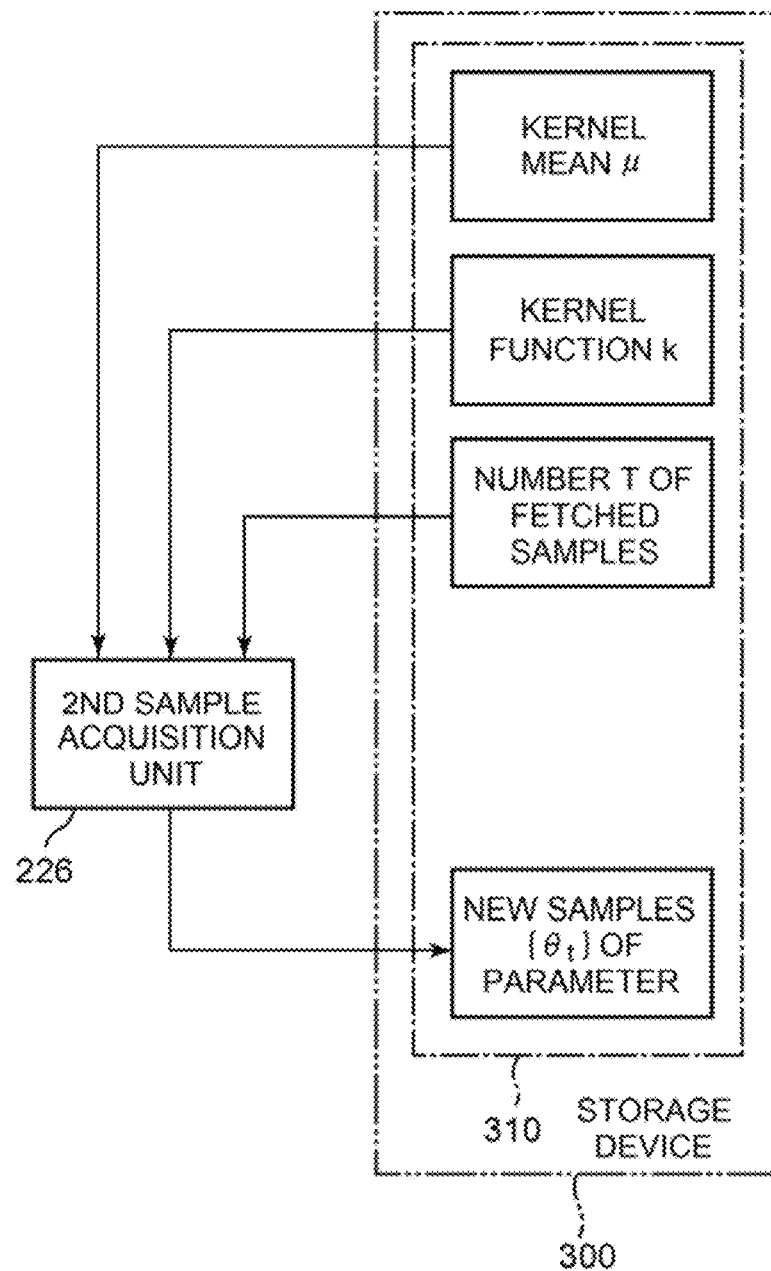
FIG. 11 is a view for describing an operation of a second sample acquisition unit for use in the machine learning device illustrated in FIG. 5.

Referring to FIG. 11, description will proceed to an operation of the second sample acquisition unit 226. The second sample acquisition unit 226 may also be called a "sample acquisition unit from a posterior distribution". The second sample acquisition unit 226 executes the above-mentioned Kernel Herding.

As shown in FIG. 11, the storage device 300 saves the kernel mean μ described above, the kernel function k described above, and the number T of fetched samples as the processing information 310.

The second sample acquisition unit 226 performs calculation so as to minimize an error represented by the following numerical expression to obtain T new samples $\{\theta_t\}$ ($1 \le t \le T$) of the parameter:

$$\epsilon_T^2 := \left\| \mu - \frac{1}{T} \sum_{t=1}^{T} k(\bullet, \theta_t) \right\|. \quad \text{[Math. 12]}$$

The T new samples $\{\theta_t\}$ of the parameter, thus obtained, are saved in the storage device 300 as the processing information 310.

Figure 12:
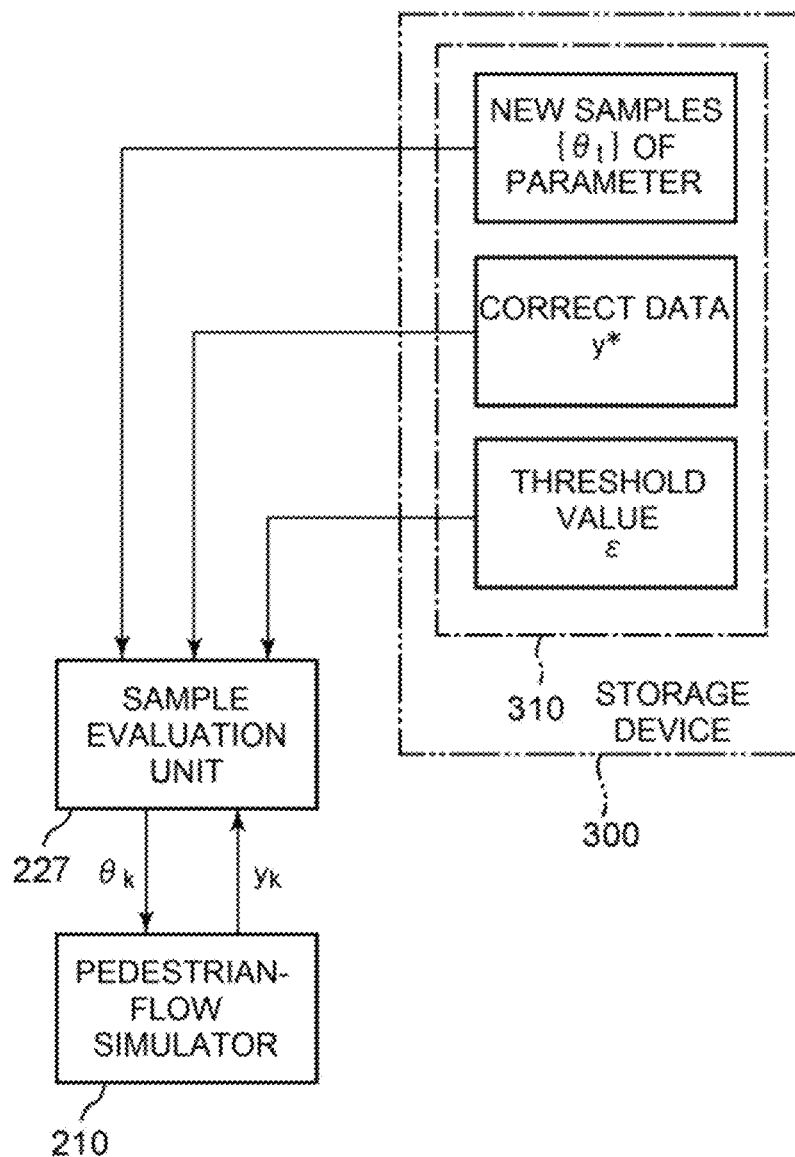
FIG. 12 is a view for describing an operation of a sample evaluation unit for use in the machine learning device illustrated in FIG. 5.

Finally, referring to FIG. 12, description will proceed to an operation of the sample evaluation unit 227.

As shown in FIG. 12, the storage device 300 saves the T new samples $\{\theta_t\}$ of the parameter described above, the correct data y* described above, and a threshold value ε as the processing information 310.

The sample evaluation unit 227 first selects a suitable sample $\theta_k$ from the T new samples $\{\theta_t\}$ of the parameter to supply the selected sample $\theta_k$ to the pedestrian-flow simulator 210. Thus, the sample evaluation unit 227 obtains new population distribution data $y_k$ from the pedestrian-flow simulator 210. Subsequently, the sample evaluation unit 227 determines whether or not the following numerical expression is satisfied: [Math. 13]

$$\|y_k - y^* I\| < \epsilon$$

That is, the sample evaluation unit 227 determines whether or not a difference $\|y_k - y^* I\|$ between the new population distribution data $y_k$ and the correct data y* is less than the threshold value ε. If the above-mentioned numerical expression is satisfied, the sample evaluation unit 227 estimates and produces the selected sample $\theta_k$ as a true parameter defining an estimated pedestrian-flow pattern. Then, the operation comes to an end.

On the other hand, if the above-mentioned expression is not satisfied, the operation is returned back to the simulation execution unit 223.

Alternatively, the operation is returned back to the first sample acquisition unit 222. In this event, if sparseness is not sufficiently introduced, the hyper parameter η suppled to the first sample acquisition unit 222 is also changed (ARD).

Example

Figure 13:
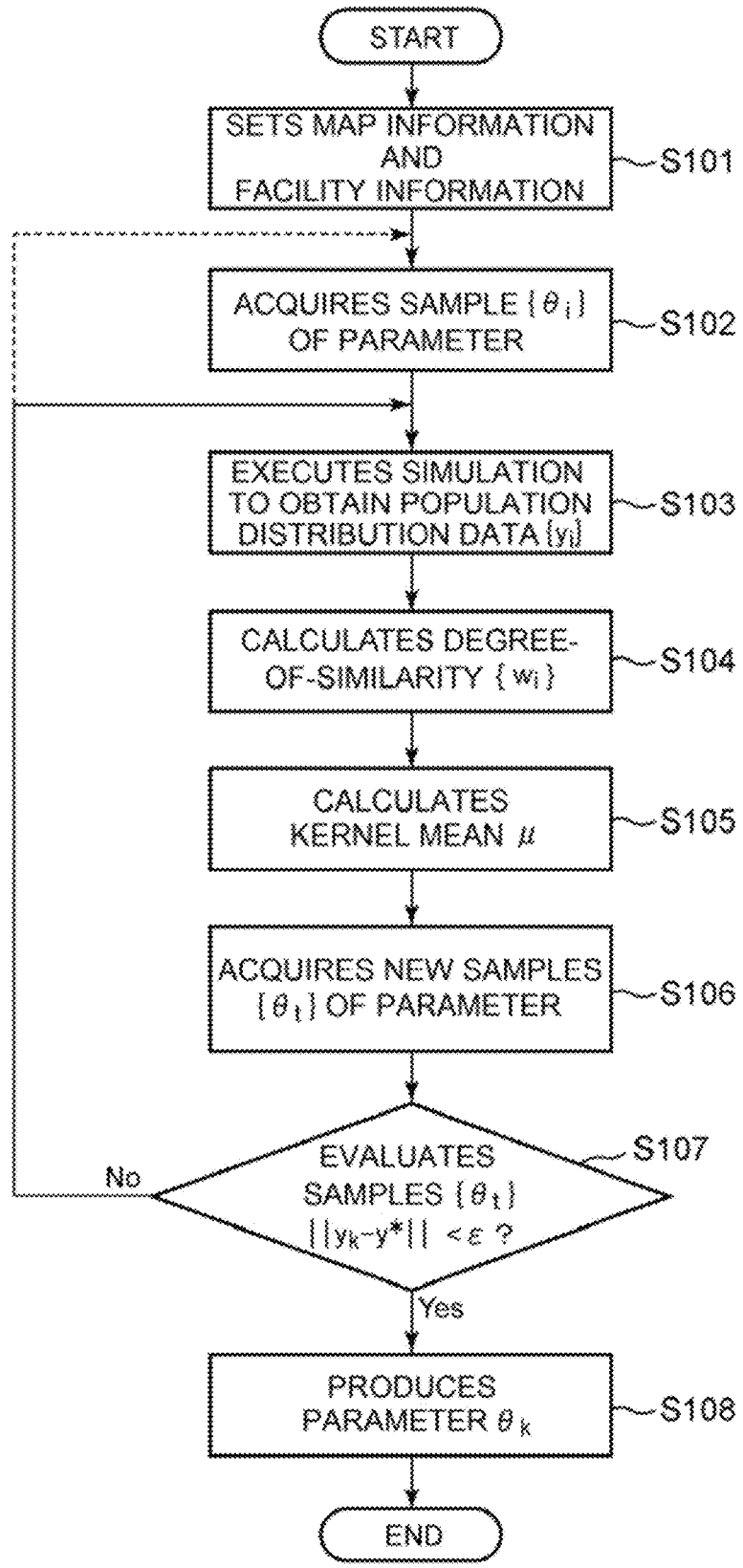
FIG. 13 is a flow chart for use in describing an example embodiment of an operation of the pedestrian-flow pattern estimation system illustrated in FIG. 1.

Referring now to a flowchart of FIG. 13, one example of the operation of the pedestrian-flow pattern estimation system 100 will be described using a specific example.

First, the data input unit 221 sets the map information and the facility information in the pedestrian-flow simulator 210 (Step S101).

Specifically, the data input unit 221 supplies the pedestrian-flow simulator 210 with a map of Ginza or the like.

Next, the first sample acquisition unit 222 fetches samples from the prior distribution P on the basis of the hyper parameter η to acquire the N samples $\{\theta_i\}$ of the parameter to be supplied to the pedestrian-flow simulator 210 (Step S102).

Specifically, the first sample acquisition unit 222 fetches, for example, 1,000 samples of the parameter θ for controlling a population group to be simulated in the map of Ginza (N=1,000).

For instance, one parameter θ comprises components as follows. Assuming a group of salaried workers visiting Ginza, the parameter θ comprises the number of persons in the group, time instants when they visit Ginza, time instants when they leave Ginza, position information of shops where they walk into, visit durations at the shops, and so on. The hyper parameter η is adjusted so as to delete superfluous parameters. For example, this makes it possible to estimate that any group walking into a convenience store only does not visit Ginza.

Subsequently, the simulation execution unit 223 supplies the pedestrian-flow simulator 210 with the sample $\{\theta_i\}$ of the parameter N times to obtain the N population distribution data $\{y_i\}$ (Step S103).

Specifically, the simulation execution unit 223 carries out simulation on samples of every single parameter obtained in the step S102. There is a difference such that, in samples of a particular parameter set, the number of persons in the group may be 1,000 whereas in another sample the number of persons may be 2,000. Since the parameter set of 1,000 samples is fetched in the step S102, the simulation execution unit 223 carries out the simulation 1,000 times. Then, the population distribution data $y_i$ thus simulated are obtained from the pedestrian-flow simulator 210.

Next, the Kernel ABC execution unit (degree-of-similarity calculation unit) 224 performs calculation of the above-mentioned Math. 10 to obtain the degrees of similarity $\{w_i\}$ between the correct data y* and the respective simulated population distribution data $\{y_i\}$ (Step S104).

Specifically, the Kernel ABC execution unit 224 compares the data $y_i$ simulated in 1,000 different forms at Ginza with the correct data y* of Ginza. By the comparison, the degrees of similarity $w_i$ between the correct data y* and the simulated data $y_i$ are calculated. The Kernel ABC execution unit 224 determines, on the basis of the degrees of similarity $w_i$, plausibility of the sample $\theta_i$ of the parameter associated with the simulated data.

Subsequently, the kernel mean construction unit 225 calculates the kernel mean μ of the posterior distribution according to the above-mentioned Math. 11 (Step S105).

Specifically, the kernel mean construction unit 225 constructs, on the basis of the degrees of similarity $w_i$ calculated in the step S104, the kernel mean μ of the posterior distribution regarding the samples $\theta_i$ of the parameter. This corresponds to readjusting a weight using the degrees of similarity $w_i$ based on the samples $\theta_i$ from the prior distribution and constructing a probability distribution on the reproducing kernel Hilbert space.

Next, the second sample acquisition unit 226 performs calculation so as to minimize the error in the above-mentioned Math. 12 to acquire the T new samples $\{\theta_t\}$ of the parameter (Step S106).

Specifically, the second sample acquisition unit 226 carries out sampling on the kernel mean μ of the posterior distribution. In this event, the new samples $\theta_t$ of the parameter are sampled. Unlike the samples $\theta_i$ of the parameter acquired in the step S102, those samples of the parameter which produce the correct data y* are required.

Subsequently, the sample evaluation unit 227 evaluates the T new samples $\{\theta_t\}$ of the parameter (Step S107).

Specifically, the sample evaluation unit 227 suitably selects one parameter $\theta_k$ from the parameter set $\{\theta_t\}$ (1≤t≤T) calculated in the step S106 and supplies the selected parameter to the pedestrian-flow simulator 210 to acquire the data $y_k$. Then, the sample evaluation unit 227 evaluates certainty of the parameter by comparing the acquired data $y_k$ with the correct data y*. When the selected parameter $\theta_k$ is sufficiently certain, the sample evaluation unit 227 makes the selected parameter be a pedestrian-flow estimated value in Ginza (Step S108).

The parameter $\theta_k$ includes information such as what sort of group comes to Ginza, where they come from, where they stays at, and where they go back from. When the certainty of the parameter $\theta_k$ is not satisfiable (No in Step S107), the pedestrian-flow pattern estimation system 100 repeats the operation once again from the step S103 or the step S102.

Next, description will proceed to experimental results in a case where the pedestrian-flow pattern estimation system 100 is executed.

Herein, experimentation of a four-mesh model in the Ginza is set. In the example, although it is divided into four meshed of (2×2), it is noted that it is divided into, for example, 5 x 5=25 meshes in an actual example. In the illustrated example, the four meshes comprise areas of (0, 0), (0, 1), (1, 0), and (1, 1). It is assumed that time instants are apart intervals of 30 minutes between 9:00 and 17:00.

Figures 14, 15:
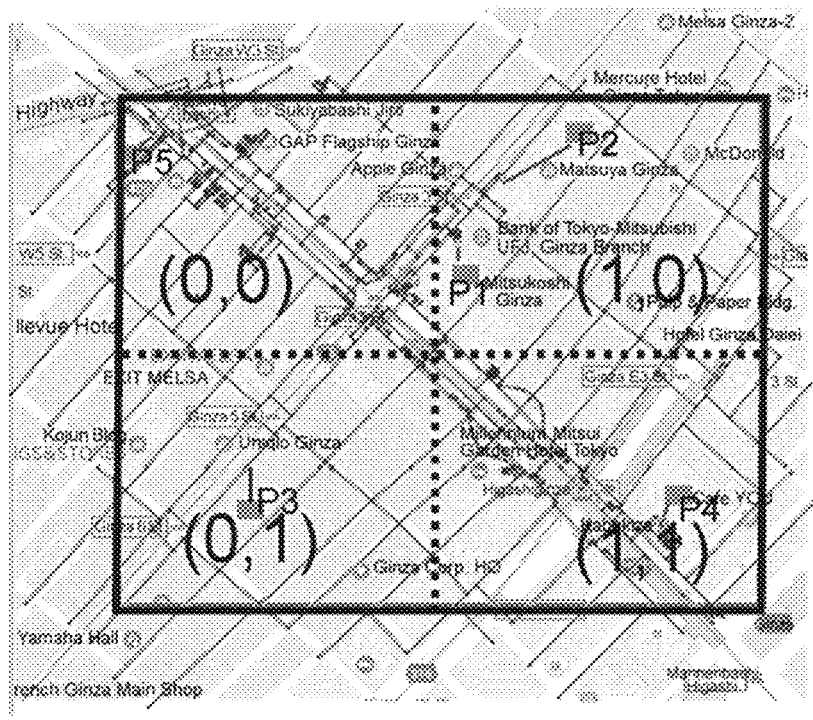
FIG. 14 is a view for illustrating an example of a four-mesh model which is used in experimentation in a case of executing the pedestrian-flow pattern estimation system illustrated in FIG. 1.
FIG. 15 is a view for illustrating an example of five rules that are set in the experimentation in a case of executing the pedestrian-flow pattern estimation system illustrated in FIG. 1.

Five rules are set as shown in FIG. 15. Therefore, an estimated parameter has forty dimensions of (Start, Goal, Transit×2, Stay×2, T, N)×5 rules. Herein, T represents a starting time instant of a group, and N represents the number of persons in the group. It is noted that, in the respective rules, N differs from the sample number N of the parameter θ whereas T differs from the sample number T of the new parameter.

Figure 16:
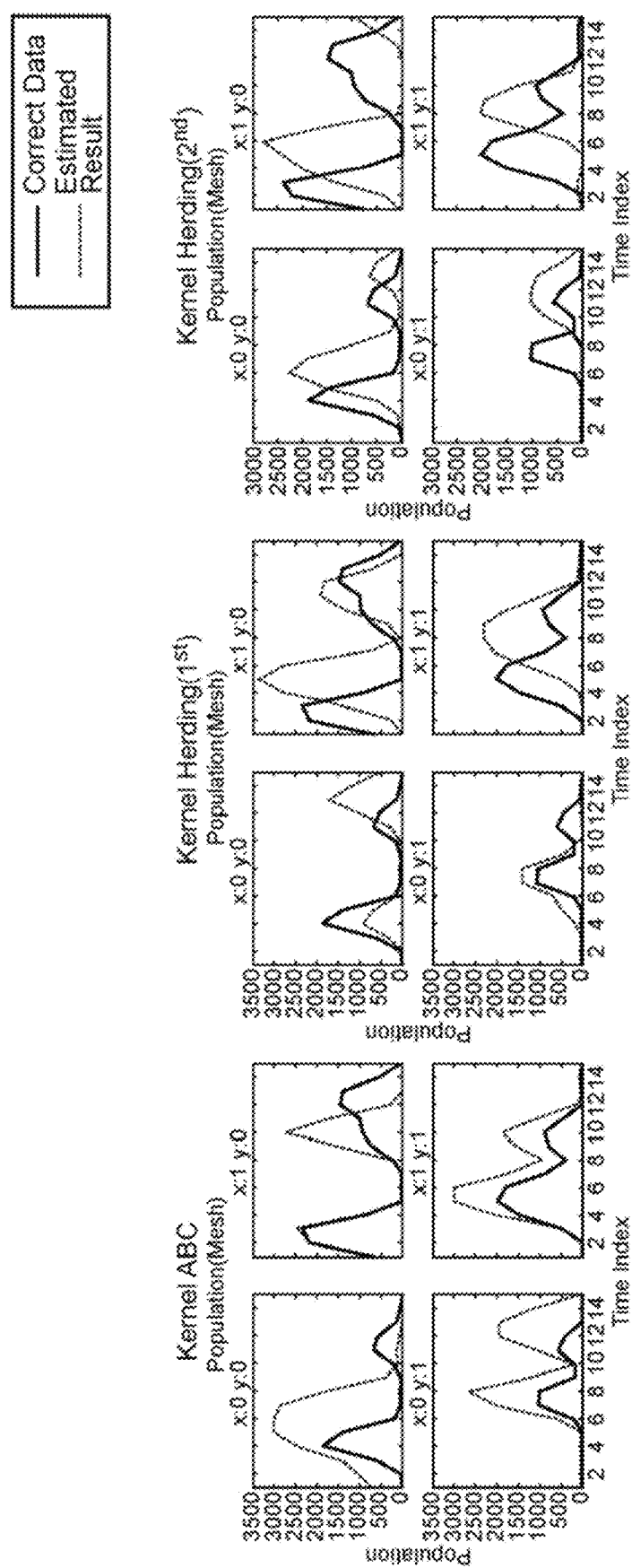
FIG. 16 is a view for illustrating experimental results of the four-mesh model illustrated in FIG. 14.

FIG. 16 shows the experimental results of the four-mesh model of Ginza illustrated in FIG. 14. In FIG. 16, left-hand views of the Kernel ABC show a change in population distribution in the respective meshes in a case where only the simulation execution unit 223 and the Kernel ABC execution unit 224 are executed only once. Central views of the Kernel Herding ($1^{st}$) show a change in population distribution in the respective meshes in a case where the simulation execution unit 223, the Kernel ABC execution unit 224, the kernel mean construction unit 225, and the second sample acquisition unit 226 are executed only once. Right-hand views of the Kernel Herding ($2^{nd}$) show a change in population distribution in the respective meshes in a case where the simulation execution unit 223, the Kernel ABC execution unit 224, the kernel mean construction unit 225, and the second sample acquisition unit 226 are executed twice.

From FIG. 16, it is understood that an estimated result having the population distribution closer to the correct data is obtained in (Kernel ABC+Kernel Herding) than in the Kernel ABC only. In addition, it is understood that an estimated result having the population distribution closer to the correct data is obtained in two-times execution of (Kernel ABC+Kernel Herding) than one-time execution of (Kernel ABC+Kernel Herding).

In the above-mentioned example embodiment, each part of the machine learning device 220 may be implemented by a combination of hardware and software. In a form in which the hardware and the software are combined, the respective parts are implemented as various kinds of means by storing a parameter estimation program in the storage device 300 as the program 320 and making hardware of the machine leaning device 220 operate based on the parameter estimation program. The parameter estimation program may be recorded in a recording medium to be distributed. The parameter estimation program recorded in the recording medium is read into a memory via a wire, wirelessly, or via the recording medium itself to operate processing units and so on. By way of example, the recoding medium may be an optical disc, a magnetic disk, a semiconductor memory device, a hard disk, or the like.

Explaining the above-mentioned example embodiment with a different expression, it is possible to implement the example embodiment by making a computer to be operated as the machine learning device 220 act as the data input unit 221, the first sample acquisition unit 222, the simulation execution unit (function execution unit) 223, the Kernel ABC execution unit (degree-of-similarity calculation unit) 224, the kernel mean construction unit 225, the second sample acquisition unit 226, and the sample evaluation unit 227 according to the parameter estimation program stored in the storage device 300 as the program 320.

While the example embodiments and the examples of the invention have been described with reference to the drawings, it is noted that, by those skilled in the art, other similar example embodiments and examples may be used and various changes or additions in configurations may be appropriately made without departing from the spirit and scope of the present invention.

A part or a whole of the above-mentioned example embodiments may be described as, but not limited to, the following supplementary notes.

Supplementary Note 1

A parameter estimation system for estimating a parameter θ of a function for producing data y, comprising a machine learning device for determining, by repetitive learning, the parameter θ to be set to the function, wherein the machine learning device comprises a first sample acquisition unit configured to acquire N (where N represents an integer which is not less than two) samples $\theta_i$ (1≤i≤N) of the parameter θ from a prior distribution P; a function execution unit configured to acquire N data $y_i$ from the function by successively supplying the N samples $\theta_i$ to the function, respectively; a degree-of-similarity calculation unit configured to calculate N degrees of similarity $w_i$ between the N data $y_i$ and correct data y* representing data using a kernel function k; a kernel mean construction unit configured to construct a kernel mean μ of a posterior distribution based on the N degrees of similarity $w_i$, the N samples $\theta_i$, and the kernel function k; a second sample acquisition unit configured to acquire T (where T represents an integer which is not less than two) new samples $\theta_t$ (1≤t≤T) of the parameter θ based on the kernel mean μ and the kernel function k; and a sample evaluation unit configured to determine whether a difference $\|y_k - y^*\|$ between new data $y_k$ and the correct data y* is less than a predetermined threshold value ε, the new data $y_k$ being obtained from the function by supplying the function with one sample $\theta_k$ selected from the T new samples $\theta_t$; wherein the sample evaluation unit estimates and produces the selected sample $\theta_k$ as the parameter θ when it is determined that the difference $\|y_k-y^*1\|$ is less than the predetermined threshold value ε.

Supplementary Note 2

The parameter estimation system according to Supplementary Note 1, wherein the first sample acquisition unit is configured to acquire the N samples $\theta_i$ while adjusting a hyper parameter η of the prior distribution P.

Supplementary Note 3

The parameter estimation system according to Supplementary Note 1 or 2, wherein the degree-of-similarity calculation unit comprises a Kernel ABC execution unit configured to calculate the N degrees of similarity $w_i$ by means of a Kernel ABC algorithm.

Supplementary Note 4

The parameter estimation system according to Supplementary Note 3, wherein the Kernel ABC execution unit is configured to calculate the N degrees of similarity $w_i$ between the N data $y_i$ and the correct data y* using the kernel function k, a Gram matrix G, and a regularization term δ.

Supplementary Note 5

The parameter estimation system according to any one of Supplementary Notes 1 to 4, wherein the kernel mean construction unit is configured to readjust a weight based on the N samples $\theta_i$ using the N degrees of similarity $w_i$ and the kernel function k and to construct the kernel mean μ representing a probability distribution on a reproducing kernel Hilbert space.

Supplementary Note 6

The parameter estimation system according to any one of Supplementary Notes 1 to 5, wherein the second sample acquisition unit configured to perform calculation so as to minimize an error calculated between the kernel mean μ and the kernel function k, the new samples $\theta_t$, and the number T of fetched samples to acquire the new samples $\theta_t$.

Supplementary Note 7

The parameter estimation system according to any one of Supplementary Notes 1 to 6, wherein, in a case where the sample evaluation unit determines that the difference $\|y_k-y^*1\|$ is larger than the predetermined threshold value ε, the parameter estimation system repeats operations of the function execution unit, the degree-of-similarity calculation unit, the kernel mean construction unit, the second sample acquisition unit, and the sample evaluation unit.

Supplementary Note 8

The parameter estimation system according to any one of Supplementary Notes 1 to 6, wherein, in a case where the sample evaluation unit determines that the difference $\|y_k-y^*\|$ is larger than the predetermined threshold value ε, the parameter estimation system repeats operations of the first sample acquisition unit, the function execution unit, the degree-of-similarity calculation unit, the kernel mean construction unit, the second sample acquisition unit, and the sample evaluation unit.

Supplementary Note 9

The parameter estimation system according to Supplementary Note 8, wherein, in a case where redundancy of the parameter θ is desired to be controlled prior to repeating the operations, the first sample acquisition unit is configured to adjust the hyper parameter η of the prior distribution P.

Supplementary Note 10

A parameter estimation method in a parameter estimation system for estimating a parameter θ of a function, the parameter estimation method being for determining, by repetitive learning, the parameter θ to be set to the function, from samples of the parameter θ, using the function for producing data y, the method comprising acquiring, in a first sample acquisition unit, N (where N represents an integer which is not less than two) samples $\theta_i$ ($1 \le i \le N$) of the parameter θ from a prior distribution P; acquiring, in a function execution unit, N data $y_i$ from the function by successively supplying the N samples $\theta_i$ to the function, respectively; calculating, in a degree-of-similarity calculation unit, N degrees of similarity $w_i$ between the N data $y_i$ and correct data y* using a kernel function k; constructing, in a kernel mean construction unit, a kernel mean μ of a posterior distribution based on the N degrees of similarity $w_i$, the N samples $\theta_i$, and the kernel function k; acquiring, in a second sample acquisition unit, T (where T represents an integer which is not less than two) new samples $\theta_t$ ($1 \le t \le T$) of the parameter θ based on the kernel mean μ and the kernel function k; and determining, in a sample evaluation unit, whether a difference $\|y_k-y^*1\|$ between new data $y_k$ and the correct data y* is less than a predetermined threshold value ε, the new data $y_k$ being obtained from the function by supplying the function with one sample $\theta_k$ selected from the T new samples $\theta_t$; wherein, in the sample evaluation unit, the selected sample $\theta_k$ is estimated and produced as the parameter θ when it is determined that the difference $\|y_k-y^*1\|$ is less than the predetermined threshold value Supplementary Note 11

A recoding medium recording a parameter estimation program causing, in a parameter estimation system for estimating a parameter θ of a function, a computer to determine, by repetitive learning, the parameter θ to be set to the function, from samples of the parameter θ, using the function for producing data y, wherein the parameter estimation program causes the computer to execute a first sample acquisition step of acquiring N (where N represents an integer which is not less than two) samples $\theta_i$ ($1 \le i \le N$) of the parameter θ from a prior distribution P; a function execution step of acquiring N data $y_i$ from the function by successively supplying the N samples $\theta_i$ to the function, respectively; a degree-of-similarity calculation step of calculating N degrees of similarity $w_i$ between the N data $y_i$ and correct data y* representing data using a kernel function k; a kernel mean construction step of constructing a kernel mean μ of a posterior distribution based on the N degrees of similarity $w_i$, the N samples $\theta_i$, and the kernel function k; a second sample acquisition step of acquiring T (where T represents an integer which is not less than two) new samples $\theta_t$ ($1 \le t \le T$) of the parameter θ based on the kernel mean μ and the kernel function k; and a sample evaluation step of determining whether a difference $\|y_k-y^*1\|$ between new data $y_k$ and the correct data y* is less than a predetermined threshold value ε, the new data $y_k$ being obtained from the function by supplying the function with one sample $\theta_k$ selected from the T new samples $\theta_t$; wherein the sample evaluation step causes the computer to estimate and produce the selected sample $\theta_k$ as the parameter θ when it is determined that the difference $\|y_k-y^*\|$ is less than the predetermined threshold value c.

INDUSTRIAL APPLICABILITY

This invention is applicable to a field of estimating a parameter by means of a maximum likelihood method when a function cannot be evaluated. For instance, this invention is also applicable to fields of estimating a parameter of a model representing financial time-series variance, a parameter of a model describing time evolution of a population of a living thing, or a parameter of a model such as to realize genetic diversity.

This application is based upon and claims the benefit of priority from Japanese patent application No. 2017-193245, filed on Oct. 3, 2017, the disclosure of which is incorporated herein in its entirety by reference.

REFERENCE SIGNS LIST

100 pedestrian-flow pattern estimation system (parameter estimation system)
200 data processing device
210 pedestrian-flow simulator (function)
220 machine learning device
221 data input unit
222 first sample acquisition unit (sample acquisition unit from prior distribution)
223 simulation execution unit (function execution unit)
224 Kernel ABC execution unit (degree-of-similarity calculation unit)
225 kernel mean construction unit
226 second sample acquisition unit (sample acquisition unit from posterior distribution)
227 sample evaluation unit
300 storage device
310 processing information
320 program
400 input device
500 output device

The invention claimed is:

1. A parameter estimation system for estimating a parameter θ of a function for producing data y, comprising a machine learning device for determining, by repetitive learning, the parameter θ to be set to the function, wherein the machine learning device comprising:
  a memory storing one or more instructions; and
  a processor configured to execute the one or more instructions to implement:
    a first sample acquisition unit configured to acquire N (where N represents an integer which is not less than two) samples $\theta_i$ ($1 \le i \le N$) of the parameter θ from a prior distribution P;
    a function execution unit configured to acquire N data $y_i$ from the function by successively supplying the N samples $\theta_i$ to the function, respectively;
    a degree-of-similarity calculation unit configured to calculate N degrees of similarity $w_i$ between the N data $y_i$ and correct data y* using a kernel function k;
    a kernel mean construction unit configured to construct a kernel mean μ of a posterior distribution based on the N degrees of similarity $w_i$, the N samples $\theta_i$, and the kernel function k;
    a second sample acquisition unit configured to acquire T (where T represents an integer which is not less than two) new samples $\theta_t$ ($1 \le t \le T$) of the parameter θ based on the kernel mean μ and the kernel function k; and
    a sample evaluation unit configured to determine whether a difference $\|y_k-y^*\|$ between new data $y_k$ and the correct data y* is less than a predetermined threshold value ε, the new data $y_k$ being obtained from the function by supplying the function with one sample $\theta_k$ selected from the T new samples $\theta_t$;
    wherein the sample evaluation unit estimates and produces the selected sample $\theta_k$ as the parameter θ when it is determined that the difference $\|y_k-y^*\|$ is less than the predetermined threshold value ε, and
    wherein the first sample acquisition unit is configured to acquire the N samples $\theta_i$ while adjusting a hyper parameter η of the prior distribution P.

2. The parameter estimation system as claimed in claim 1, wherein the degree-of-similarity calculation unit comprises a Kernel ABC execution unit configured to calculate the N degrees of similarity $w_i$ by means of a Kernel ABC algorithm.

3. The parameter estimation system as claimed in claim 2, wherein the Kernel ABC execution unit is configured to calculate the N degrees of similarity $w_i$ between the N data $y_i$ and the correct data y* using the kernel function k, a Gram matrix G, and a regularization term δ.

4. The parameter estimation system as claimed in claim 1, wherein the kernel mean construction unit is configured to readjust a weight based on the N samples $\theta_i$ using the N degrees of similarity $w_i$ and the kernel function k and to construct the kernel mean μ representing a probability distribution on a reproducing kernel Hilbert space.

5. The parameter estimation system as claimed in claim 1, wherein the second sample acquisition unit configured to perform calculation so as to minimize an error calculated between the kernel mean μ and the kernel function k, the new samples $\theta_t$, and the number T of fetched samples to acquire the new samples $\theta_t$.

6. The parameter estimation system as claimed in claim 1, wherein, in a case where the sample evaluation unit determines that the difference $\|y_k-y^*\|$ is larger than the predetermined threshold value ε, the parameter estimation system repeats operations of the function execution unit, the degree-of-similarity calculation unit, the kernel mean construction unit, the second sample acquisition unit, and the sample evaluation unit.

7. The parameter estimation system as claimed in claim 1, wherein, in a case where the sample evaluation unit determines that the difference $\|y_k-y^*\|$ is larger than the predetermined threshold value £, the parameter estimation system repeats operations of the first sample acquisition unit, the function execution unit, the degree-of-similarity calculation unit, the kernel mean construction unit, the second sample acquisition unit, and the sample evaluation unit.

8. The parameter estimation system as claimed in claim 7, wherein, in a case where redundancy of the parameter θ is desired to be controlled prior to repeating the operations, the first sample acquisition unit is configured to adjust the hyper parameter η of the prior distribution P.

9. A parameter estimation method in a parameter estimation system for estimating a parameter θ of a function, the parameter estimation method being for determining, by repetitive learning, the parameter θ to be set to the function, from samples of the parameter θ, using the function for producing data y, the method comprising:

acquiring N (where N represents an integer which is not less than two) samples $\theta_i$, ($1 \leq i \leq N$) of the parameter $\theta$ from a prior distribution P;

acquiring N data $y_i$ from the function by successively supplying the N samples $\theta_i$, to the function, respectively;

calculating N degrees of similarity $w_i$ between the N data $y_i$ and correct data y* using a kernel function k;

constructing a kernel mean $\mu$ of a posterior distribution based on the N degrees of similarity $w_i$, the N samples $\theta_i$, and the kernel function k;

acquiring T (where T represents an integer which is not less than two) new samples $\theta_t$ ($1 \leq t \leq T$) of the parameter $\theta$ based on the kernel mean $\mu$ and the kernel function k; and determining whether a difference $\|y_k - y^*\|$ between new data $y_k$ and the correct data y* is less than a predetermined threshold value $\varepsilon$, the new data $y_k$ being obtained from the function by supplying the function with one sample $\theta k$ selected from the T new samples $\theta_t$;

wherein the selected sample $\theta_k$ is estimated and produced as the parameter $\theta$ when it is determined that the difference $\|y_k - y^*\|$ is less than the predetermined threshold value $\varepsilon$ and wherein the N samples $\theta_i$ are acquired while adjusting a hyper parameter $\eta$ of the prior distribution P.

10. A non-transitory recoding medium recording a parameter estimation program causing, in a parameter estimation system for estimating a parameter $\theta$ of a function, a computer to determine, by repetitive learning, the parameter $\theta$ to be set to the function, from samples of the parameter $\theta$, using the function for producing data y, wherein the parameter estimation program causes the computer to execute:

a first sample acquisition step of acquiring N (where N represents an integer which is not less than two) samples $\theta_i$($1 \leq i \leq N$) of the parameter $\theta$ from a prior distribution P;

a function execution step of acquiring N data $y_i$ from the function by successively supplying the N samples $\theta_i$ to the function, respectively;

a degree-of-similarity calculation step of calculating N degrees of similarity $w_i$ between the N data $y_i$ and correct data y* using a kernel function k;

a kernel mean construction step of constructing a kernel mean $\mu$ of a posterior distribution based on the N degrees of similarity $w_i$, the N samples $\theta_i$, and the kernel function k;

a second sample acquisition step of acquiring T (where T represents an integer which is not less than two) new samples $\theta_t$ ($1 \leq t \leq T$) of the parameter $\theta$ based on the kernel mean $\mu$ and the kernel function k; and a sample evaluation step of determining whether a difference $\|y_k - y^*\|$ between new data $y_k$ and the correct data y* is less than a predetermined threshold value $\varepsilon$, the new data $y_k$ being obtained from the function by supplying the function with one sample $\theta k$ selected from the T new samples $\theta_t$;

wherein the sample evaluation step causes the computer to estimate and produce the selected sample $\theta k$ as the parameter $\theta$ when it is determined that the difference $\|y_k - y^*\|$ is less than the predetermined threshold value $\varepsilon$ and wherein the first sample acquisition step causes the computer to acquire the N samples $\theta_i$ while adjusting a hyper parameter $\eta$ of the prior distribution P.

* * * * *